(12) United States Patent
Drotlef et al.

(10) Patent No.: US 12,534,644 B2
(45) Date of Patent: Jan. 27, 2026

(54) CARRIER, USE OF A CARRIER, METHOD OF ACTIVATING A CARRIER AND METHOD OF MAKING A CARRIER

(71) Applicant: MAX-PLANCK-GESELLSCHAFT ZUR FÖRDERUNG DER WISSENSCHAFTEN E.V., Munich (DE)

(72) Inventors: Dirk-Michael Drotlef, Sindelfingen (DE); Metin Sitti, Stuttgart (DE); Morteza Amjadi, Stuttgart (DE)

(73) Assignee: MAX-PLANCK-GESELLSCHAFT ZUR FÖRDERUNG DER WISSENSCHAFTEN E.V., Munich (DE)

( * ) Notice: Subject to any disclaimer, the term of this patent is extended or adjusted under 35 U.S.C. 154(b) by 1384 days.

(21) Appl. No.: 16/500,442

(22) PCT Filed: Apr. 9, 2018

(86) PCT No.: PCT/EP2018/059013
§ 371 (c)(1),
(2) Date: Oct. 3, 2019

(87) PCT Pub. No.: WO2018/189099
PCT Pub. Date: Oct. 18, 2018

(65) Prior Publication Data
US 2023/0139095 A1 May 4, 2023

(30) Foreign Application Priority Data
Apr. 13, 2017 (EP) .................. 17166485

(51) Int. Cl.
*C09J 7/29* (2018.01)
*A61B 5/00* (2006.01)
*B29C 33/42* (2006.01)

(52) U.S. Cl.
CPC ............ *C09J 7/29* (2018.01); *A61B 5/6832* (2013.01); *B29C 33/424* (2013.01)

(58) Field of Classification Search
CPC ......... C09J 7/29; A61B 5/6832; B29C 33/424
See application file for complete search history.

(56) References Cited

U.S. PATENT DOCUMENTS 10,932,721 B2 * 3/2021 Oren ................. B32B 9/045
2005/0159522 A1 * 7/2005 Bublewitz ............ C08L 83/04
524/430

(Continued)

FOREIGN PATENT DOCUMENTS

CA 2664323 A1 * 4/2008 ............... C09J 7/22
DE 19724648 A1 * 12/1998 ............... G09F 3/10

(Continued)

OTHER PUBLICATIONS

Official Communication received from the European Patent Office for related European Patent Application No. 17166485.7; dated: Jan. 9, 2018; 8 pages.

*Primary Examiner* — Travis M Figg
(74) *Attorney, Agent, or Firm* — Dickinson Wright PLLC

(57) ABSTRACT

The present invention relates to a carrier for adhesive, with the carrier being configured to be attached to a surface having a topology, in particular a time variable topology, such as a part of a human or animal body. The invention further relates to a use of the carrier, to a method of activating a carrier and to a method of making a carrier.

21 Claims, 11 Drawing Sheets

(56) References Cited

U.S. PATENT DOCUMENTS

Figure 1:
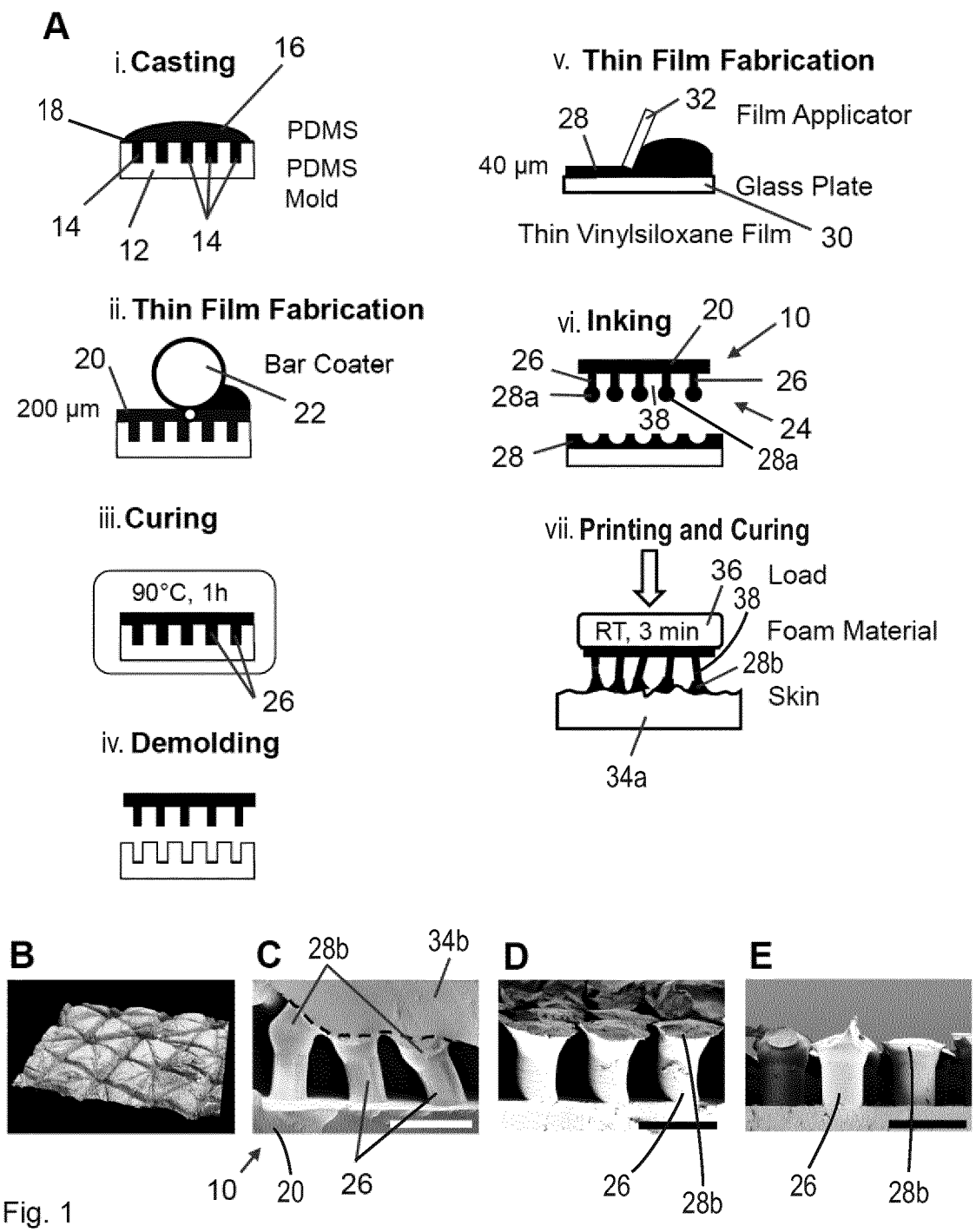

| | | | | |
|---|---|---|---|---|
| 2005/0282977 A1* | 12/2005 | Stempel | ............... | C08L 83/04 |
| | | | | 428/447 |
| 2008/0169059 A1* | 7/2008 | Messersmith | ............ | C09J 7/00 |
| | | | | 427/256 |
| 2010/0280175 A1 | 11/2010 | Rosing et al. | | |
| 2013/0200541 A1* | 8/2013 | Kita | ............... | B22D 25/02 |
| | | | | 205/70 |
| 2015/0028325 A1* | 1/2015 | Seki | ............... | B29C 45/263 |
| | | | | 264/293 |
| 2015/0329743 A1* | 11/2015 | Lu | ............... | C09J 7/00 |
| | | | | 428/196 |
| 2017/0219331 A1* | 8/2017 | Pegan | ............... | G01L 1/2287 |
| 2021/0009863 A1* | 1/2021 | Abe | ............... | C08F 220/1808 |

FOREIGN PATENT DOCUMENTS

| | | |
|---|---|---|
| WO | 2009009749 A1 | 1/2009 |
| WO | 2009046989 A2 | 4/2009 |
| WO | 2010056543 A1 | 5/2010 |

\* cited by examiner

CARRIER, USE OF A CARRIER, METHOD OF ACTIVATING A CARRIER AND METHOD OF MAKING A CARRIER

The present invention relates to a carrier for an adhesive, to a use of a carrier, to a method of activating a carrier and to a method of making a carrier.

Considerable attention is being paid to wearable medical systems owing to their seamless integration with the human body and prolonged recording of physiological activities. Continuous monitoring of important vital signs, such as respiratory rate, heart rate, body temperature, and blood pressure level, can greatly assist early diagnosis of diseases and subsequent therapy.

To this end various wearable payloads comprising physical sensors, electrochemical transducers, and transdermal drug delivery systems have been developed by the incorporation of functional nanomaterials into flexible supporting materials. Recently, it has been shown that multifunctional wearable systems can accomplish simultaneous sensation and on-demand release of therapeutic compounds. Despite remarkable advances having already been made with regard to wearable medical devices, their conformal attachment to the rough, curvilinear, soft, and textured surface of the skin remains a challenge. In fact, strong adhesion between wearable systems and skin is required for noise-free, sensitive, and accurate monitoring of body signals.

Nature can offer alternative strategies for strong and reliable adhesion to complex surfaces. For instance, geckos can adhere to rough surfaces with their adhesive pads consisting of dense arrays of fine hairs or starfishes stick to complex underwater surfaces through chemical glue secretion. Inspired by such biological systems, chemical adhesives, gecko-inspired microfibers, and microneedle arrays with swellable tips have been proposed for strong attachment to complex surface topographies.

However, their adhesion performance on skin is still questionable. For example, adhesives based on chemical bonding can irritate the skin and cause pain during their removal. Although gecko-inspired adhesive fibers demonstrate strong and reversible adhesion on smooth surfaces, their adhesion on slightly rough and soft surfaces is poor. On the other hand, microneedle arrays with swellable tips require harmful skin piercing for suitable adhesion.

Recently, alternative approaches, such as microfibers with soft tips and hard fibers, low modulus and miniaturized suction cup designs, adhesive composite materials, and ultrathin packaging, have been pursued to enhance the skin adhesion. However, they require complex, multistep, and time-consuming microfabrication processes.

Further prior art is known from the following documents US2015/329473A1, WO2009/046989A2, US2010/280175A1, WO2009/009749A1, and WO2010056543 A1.

For this reason it is an object of the present invention to provide a carrier that can be removeably attached to the skin of a human or an animal. It is a further object to provide a carrier having conformal and reliable skin adhesion through a facile, cost-effective, and mass-producible method. It is a further object of the invention to provide a carrier that facilitates or forms the connection to a payload. It is yet a further object of the invention that the carrier enhances the functional capabilities of the payload.

This object is satisfied by a carrier having the features of claim 1.

Such a carrier for an adhesive is configured to be attached to a surface having a topology, in particular a time variable topology, such as a part of a human or animal body, the carrier comprising:

a backing substrate, wherein the backing substrate is an interface to a payload;

a patterned surface having islands present at the surface; wherein at least one of the islands and the backing substrate is made from a compliant material, wherein at least a part of a free surface of the islands is coated with an ink comprising curable material, wherein the ink is selected to bond the islands of the carrier to a further object.

By providing a carrier having both islands and a backing substrate of which at least one is made from a compliant material one can obtain a carrier that has a good skin conformity similar to that of a gel and significantly better than that achievable using a fiber method, while at the same time obtaining a structure that—like a fiber structure—has a good strength and can allow the skin beneath the carrier to breathe and sweat which is generally not achievable using a gel method.

In this connection a compliant material is a type of material that can readily adapt its shape, i.e. be deformed, in order to adapt to and/or conform to the shape of the surface and preferably also to the properties of the surface to which it is to be attached.

It should be noted in this connection that depending on which body part the carrier is connected to that the skin of said body part is likely to move, e.g. due to the breathing of the human if the carrier is placed on the chest of a human, due to a movement of the skin if the carrier is placed proximal to a joint, e.g. if jewelry is to be worn by means of the carrier. Other forms of time-varying surfaces are provided by e.g. finger and toe nails. These grow at a comparatively slow rate in comparison to the breathing of a human or animal, but cause the inherent roughness of the surface to change over time. In use of the carrier as a bonding agent to bond e.g. (example is confidential)—decorations to a finger nail, the carrier in accordance with the invention can readily compensate for these changes.

It should further be noted that the carrier can be used to connect biological tissue to non-biological tissue, the carrier can be used to connect rough surface topologies to smooth surface topologies, the carrier can also be used to connect moist and in particular wet surfaces to dry surfaces. The carrier can also be used to connect soft surfaces to rigid surfaces and also comparatively dirty surfaces to clean surfaces (and vice versa). These uses are due to the compliant material that enables the carrier to compensate for differences between two objects between which it is to form a connection. This is because the compliant material permits an adaptation to the topology of at least one of the surfaces to which the carrier is to be attached.

It should be noted that the use of the carrier is by no means restricted to the use on the human or animal body. Many other applications are conceivable for example attachment of a sensor and transmitter to a surface of a golf or tennis ball to analyse in flight performance thereof.

Preferably the ink is selected to form a connection between the payload and the further object. The payload can be configured to determine properties of the object and/or to exert a function on the object. By tailoring the ink to the respective property and/or function, the ink can be used to enhance the transmission of the respective property and/or function to and/or from the payload.

In this connection it is preferred if the ink and the islands form a mechanical connection to the payload, with the mechanical connection being configured to enhance a property of the object to be measured by the payload. Such a mechanical connection can be a releasable or a non-releasable connection depending on the specific application and permits the enhancement of the respective transmission of the respective property and/or function between the payload and the object.

In this connection the payload could be a strain sensor and the ink and the islands are configured to transmit deformations and stresses from the object to the payload. In this way the strain sensor can, for example, be configured to measure the size of pressure pulsations of a pulsating object, for example, the pressure pulsations of a blood vessel lying beneath the skin of a human or animal can be measured to determine, e.g. the heart rate, the blood pressure etc.

Additionally or alternatively the payload could also be an electrical sensor and the ink and the islands are configured to transmit electrical signals from the object to the payload. For example, the signals transmitted relate to signals of an ECG of a human or animal heart that is currently being monitored.

Additionally or alternatively the payload could also be a temperature sensor and the ink and the islands are configured to conduct thermal parameters from the object to the payload. For example, the temperature of a human or animal could be measured via the carrier.

Additionally or alternatively the payload could also be a chemical sensor and the ink and the islands are configured to permit a flow of compounds from the object to the payload. For example, traces of chemicals present at the skin of a human or animal could be transmitted from the skin to the payload.

Advantageously a liquid permeability of the free space present between individual islands of the carrier is selected in the range of $10^5$ to $10^{-20}$ [cm$^2$], in particular of $10^1$ to $10^{-10}$ [cm$^2$] at room temperature; and/or wherein a gaseous permeability of the free space present between individual islands of the carrier is selected in the range of $10^5$ to $10^{-20}$ [cm$^3$*cm*cm$^{-2}$*s$^{-1}$*cmHg$^{-1}$], in particular of $10^1$ to $10^{-10}$ [cm$^3$*cm*cm$^{-2}$*s$^{-1}$*cmHg$^{-1}$] at room temperature, In this way the carrier can enhance the flow of gases and/or liquids between the object and the carrier.

Preferably the compliant material is a flexible material, in particular a material having a flexibility selected to conform and/or adapt to the topology of the surface.

Providing a carrier that can in particular conform to and adapt to a time variable surface topology makes available a carrier that can be attached to the human or animal body.

It is preferred if the compliant material is a flexible material forming at least one of the backing substrate and the islands and the flexible material has a Young's modulus selected in the range of 10 kPa to 600 MPa. A material having such a Young's modulus has an inherent flexibility which permits it to be deformed such that it can adapt to the specific shape or topology of the surface to which it is to be attached.

Advantageously voids are present between the islands, optionally wherein a ratio of surface area of voids to a surface area of islands defines the density of islands on said carrier. (less voids surface area is better for adhesion) it is preferred if the ratio of the surface area of the voids to the surface area of the islands is selected in the range of $10^{-4}$:$10^4$ to $10^4$:$10^{-4}$, preferably in the range of 0.01:100 to 100:0.01, most preferably in the range of 1:10 to 10:1.

In a preferred embodiment the islands are integral with the backing substrate, i.e. the islands are made of the same material and non-releasably bonded to the backing substrate. Alternatively the islands are connected to the backing substrate this means that they could be formed by different materials and are connected to one another on forming the substrate.

It is preferred if the islands are regularly or irregularly spaced asperities. Forming regularly spaced asperities means that the ratio of the surface area of the voids to the surface area of the islands can be predefined in a simple manner. If, on the other hand, irregularly spaced asperities are selected then the carrier can e.g. be used to connect to regions of the human body having a joint where a non-uniform distribution of asperities may be beneficial to achieve the best adhesion of the carrier to the region around the joint.

It is preferred if the asperities are regularly or irregularly shaped, wherein the asperities are pillars, preferably wherein the pillars are cubic, pyramidal, spherical, cylindrical, conic, cuboidal, triangular or hexagonal. Preferably the asperities are pillars that optionally have an at least substantially cylindrical shape. Asperities formed as pillars can, on the one hand, be manufactured in a simple manner. On the other hand, pillars can be easily deformed facilitating the conformity and/or adaptation of the carrier to a surface to which the carrier is applied.

Depending on the type of pillar or asperity used these can conveniently have an aspect ratio of diameter to height selected in the range of $10^{-4}$ to $10^4$, preferably in the range of 0.01 to 1000, most preferably in the range of 0.1 to 10 and especially in the range of 1 to 5.

In this connection it should be noted that a diameter of the islands is typically selected in a size range of 10 nm to 100 mm, preferably in the size range of 0.1 μm to 1000 μm. A height of the islands is typically selected in the size range of 10 nm to 100 mm and preferably in the size range of 0.1 μm to 1000 μm. A width of the backing substrate of the carrier is typically selected in the range of 1 μm to 100 cm and a breadth of the carrier is typically selected in the range of 1 μm to 100 cm. A thickness of the backing substrate is typically selected in the range of 0.01 μm to 10 cm.

Preferably the backing substrate is an interface to a payload. As a wearable device application of the skin-adhesive films, these can be integrated with wearable strain sensors for respiratory and heart rate monitoring. The signal-to-noise ratio (SNR) of the strain sensor is significantly improved to 59.7 (signal-to-noise ratio) because of the considerable enhanced signal transfer of microfibrillar skin-adhesive films.

It is preferred if at least one of the islands and the backing substrate comprises filler materials, wherein the filler materials are preferably selected from the group of members consisting of organic, inorganic, metals, alloys, ceramics, glass, polymers, rubbers, biomaterials, composites, foams, fabric materials, particle material, fibrous material and combinations of the aforementioned materials.

In this way a further type of material can be introduced into the compliant material to form a carrier that can not only conform and/or adapt to the surface but also to provide a functionalized carrier that facilitates a function of a payload connected to the carrier. This is particularly beneficial if the payload is a payload such as an ECG or EEG sensor that is attached to the carrier. The inclusion of conductive particles in the compliant material then enhances the conduction of the EEG or ECG signals to the sensor from the skin.

Preferably a material of the islands and/or of the backing substrate is selected from the group of members consisting of organic, inorganic, metals, alloys, ceramics, glass, polymers, rubbers, biomaterials, composites, foams, fabric materials, particle material, fibrous material and combinations of the aforementioned materials and combinations of the aforementioned materials. Such materials are simple to handle and enable a production of carriers tailored to their specific use.

On use of the carrier it is preferred if at least a part of a free surface of the islands is coated with an ink. This ink can be used as an interface to the surface to which the carrier is to be attached. The ink acts an adhesive layer, on the one hand, and as a layer that enhances the conformity and/or adaptation of the carrier to the surface of the object, on the other hand. The carrier in accordance with the invention is suitable for an adhesive. The ink specified herein is preferably such an adhesive.

It should be noted that the ink used can achieve an adhesion strength in the range of 0.01 kPa to 10.000 kPa, in particular in the range of 0.1 kPa to 1.000 kPa, on selecting appropriate pattern geometries and processing parameters of skin-adhesive films.

Advantageously the ink comprises a curable material, i.e. a material that provides a cross-linking or adhesion to the material of the islands and preferably also to the object to which the carrier is subsequently connected, with the curable material being selected form the group of members consisting of the same material as the islands, thermally crosslinkable material, photocrosslinkable material, moisture crosslinkable material, catalytically crosslinkable material, redox reaction crosslinkable material. Such an ink facilitates the function of the ink as a mode of connection of the carrier to the object.

It is preferred if the ink is selected to bond the islands of the carrier to a further object, wherein the ink is preferably selected to releasably bond the carrier to the further object. On use of the carrier, for example, to connect electrodes to the human or animal body, these are advantageously connected thereto in a releasable manner.

Preferably, after curing the ink, a diameter of portions of the islands having the cured ink thereon is smaller, similar or larger than the diameter of said portion prior to the application of ink, preferably wherein the diameter of tips of the islands having the ink cured thereon is smaller, similar or larger than the diameter of a portion of the islands that is free of ink, in particular such that a mushroom shaped pillar is formed. In this way an island is created which has the ability to conform and/or adapt to the surface via the portions of the islands having a reduced diameter, whereas at the tips of the islands, i.e. the regions of the islands which are configured to bond to a surface, sufficient surface area is provided to enable a good bond between the carrier and the object.

It should be noted in this connection that the carrier presented herein is a re-usable carrier. Each time the carrier is to be re-used it, or the tips of the islands, simply have to be re-dipped in ink to reactivate a capability of being cross-linked. In this connection a carrier can still be used even if a continuous film of cross-linking material has formed which covers a plurality of tips or maybe even all of the tips of the carrier. The compliant material of the islands and/or of the backing substrate then still permits the complete tip present in the form of a surface to conform to and/or adapt to a surface to which the carrier is to be attached.

In this connection it should be noted that during a first time dipping of the islands into said ink that some of the islands can be connected to one another via the ink such that a continuous film of cross-linking material has formed which covers a plurality of tips.

In view of the foregoing a novel approach is proposed for strong adhesion of wearable sensors to dry and wet skin. Preferably composite microfibrillar adhesive films are made available that are composed of elastomeric microfibers decorated with mushroom-head-shaped, biocompatible vinylsiloxane tips. Crosslinking the viscous vinylsiloxane tips directly on the skin surface significantly enhances the adhesion performance due to their great shape adaptation, which in turn highly promotes the output signal quality of wearable strain sensors.

According to a further aspect the present invention relates to a use of the carrier in accordance with the teaching present herein, for wearable medical devices, for objects worn at the human or animal body, for cosmetic articles attachable to the human body.

The advantages described in connection with the carrier likewise hold true for the use of the carrier.

According to a further aspect the present invention relates to a method of activating a carrier for bonding to an object, the carrier comprising:
a backing substrate;
a patterned surface having islands present at the surface;
wherein at least one of the islands and the backing substrate is made from a compliant material, with the method comprising the steps of:
at least partly immersing the islands of the carrier into an ink reservoir,
placing the islands of the carrier comprising the ink present thereon onto an object; and
curing the material of the ink to adhere or form a bond between the carrier and the object.

The advantages described in connection with the carrier likewise hold true for the method of activating the carrier.

In a further aspect the present invention relates to a method of making a carrier, the carrier comprising:
a backing substrate;
a patterned surface having islands present at the surface;
wherein at least one of the islands and the backing substrate is made from a compliant material, with the method comprising the steps of:
providing a mold having cavities formed therein resembling a shape of islands to be formed on a carrier;
filing at least the cavities of the mold with a first material;
optionally providing a second material on top of the first material; with at least one of the first and second material also forming a backing substrate;
curing the first material to form a patterned surface on top of the backing substrate; and optionally wherein the method comprises at least one of the following further steps:
at least partly immersing the islands of the carrier into an ink reservoir,
placing the islands of the carrier comprising the ink present thereon onto an object; and
curing the material of the ink to adhere or form a bond between the carrier and the object.

The advantages described in connection with the carrier likewise hold true for the method of making the carrier.

In this way a facile method for superior conformation and adhesion of bio-inspired composite microfibers to the hierarchical topography of soft and textured skin is made available by means of the method of making the carrier. The preferably soft and stretchable skin-adhesive micropatterns are in particular composed of polydimethylsiloxane (PDMS)

microfibers decorated with conformal and mushroom-shaped vinylsiloxane (VS) tips. It is shown that crosslinking of the viscous VS tips directly on the skin surface can greatly enhance the skin adhesion through their excellent shape conformation to the multi-scale roughness of the skin.

Figure 11:
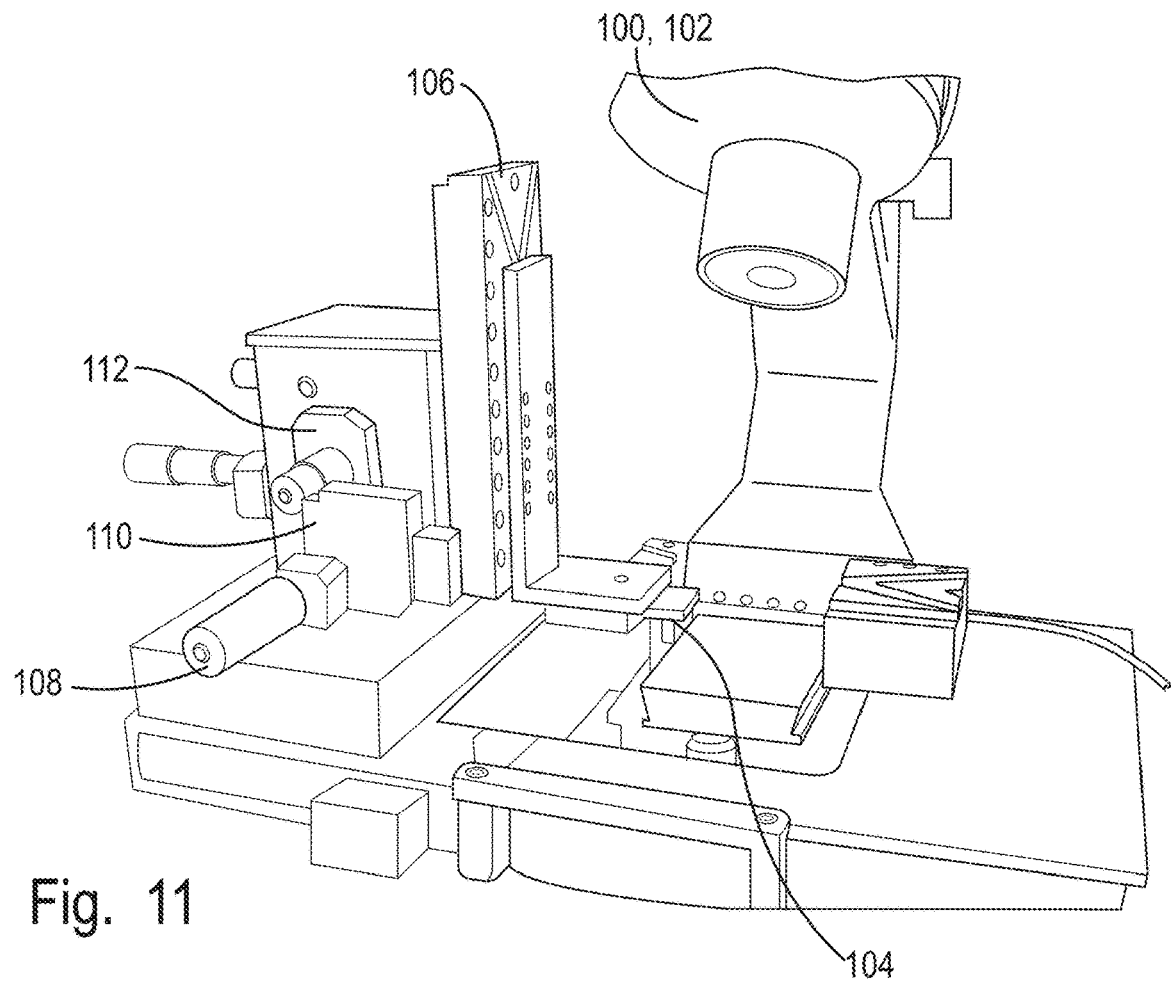
Figure 12:
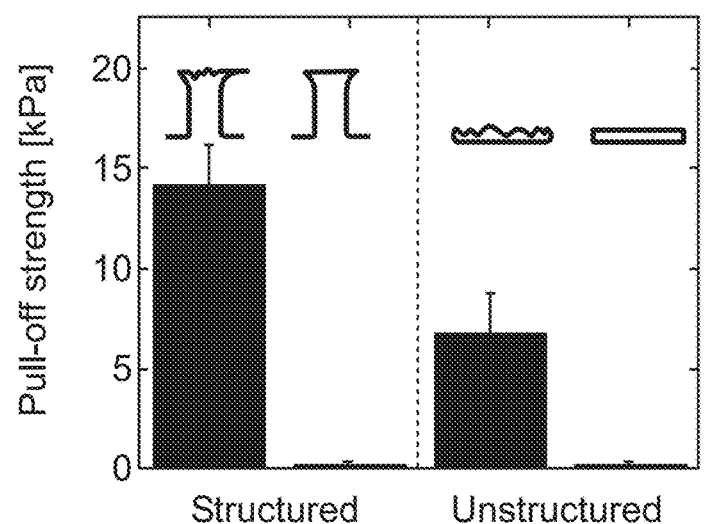
Figure 14:
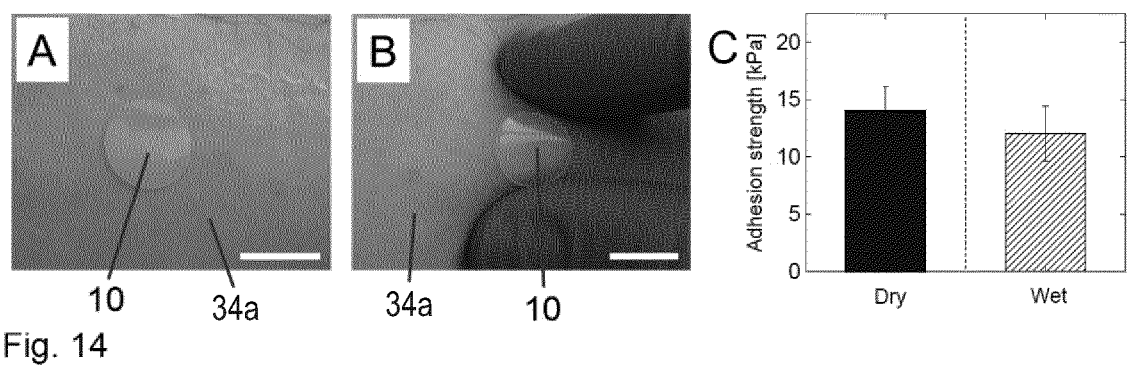
Figure 15:
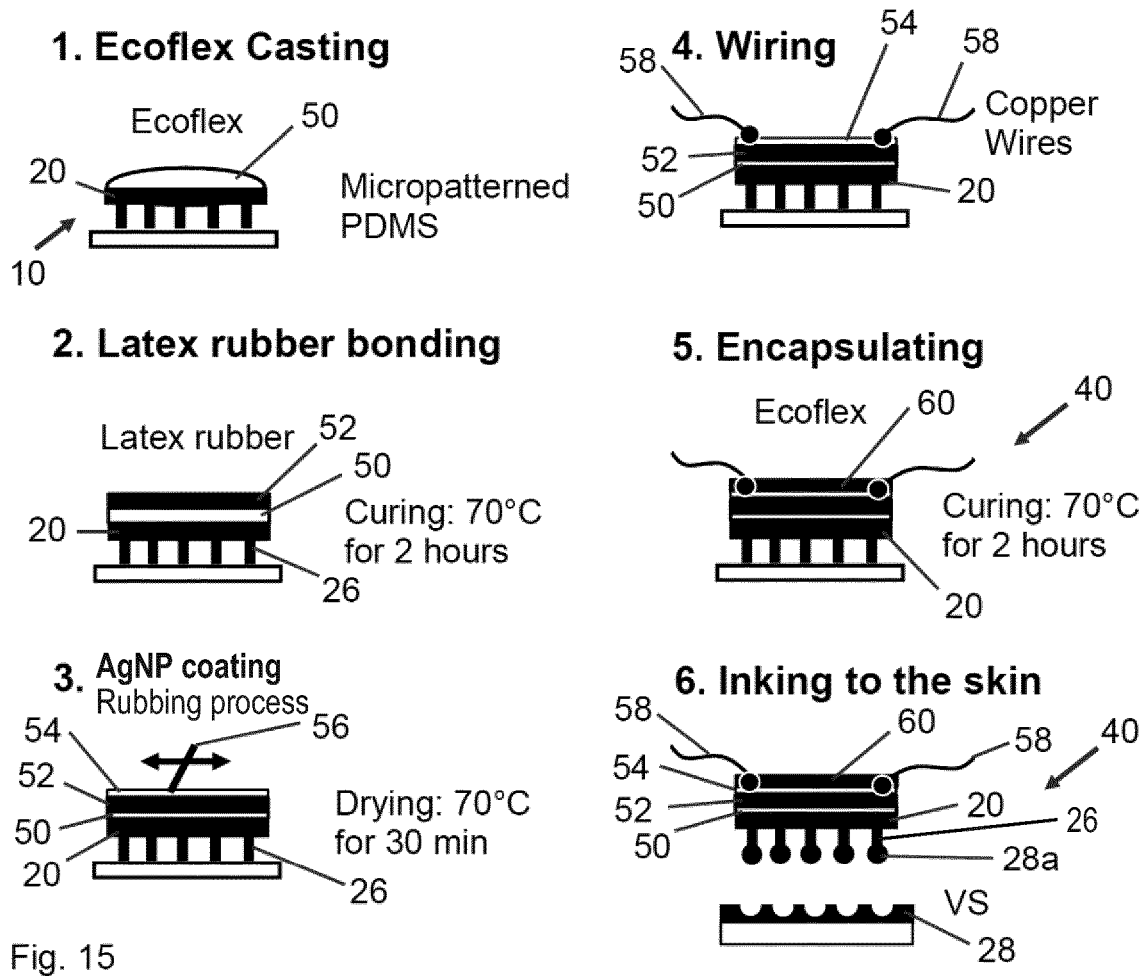

Further embodiments of the invention are described in the following description of the Figures. The invention will be explained in the following in detail by means of embodiments and with reference to the drawing in which is shown:

FIGS. 1A to E A) fabrication process of the skin-adhesive films; B) 3D laser-scanning microscope image of the skin surface in the biological human forearm; C) cross-sectional SEM image of an adhesive film attached to an artificial skin replica; D) cross-sectional SEM image of an adhesive film after its detachment from a planar area of the skin; E) cross-sectional SEM image of microfibers showing the conformation of different fiber tips on different locations on the skin;

FIGS. 2A to D A) optical microscope images of patterns of islands with different aspect ratios (ARs) after their detachment from the skin; B) microscope images of patterns of islands under different preload pressures after their detachment from the skin; C) microscope images of patterns of islands inked to the viscous VS layers with different thicknesses; D) microscope images of microfibers inked into VS films after different pre-crosslinking durations;

FIGS. 3A to K. force-displacement curves and adhesion measurements of the composite microfibrillar adhesive films attached to the skin;

FIGS. 4A to F wearable skin-adhesive strain sensors for healthcare applications;

FIGS. 5A to C. 3D laser-scanning microscope images of PDMS microfibers with different ARs;

FIGS. 6A to C 3D laser-scanning microscope image of an artificial PDMS skin replica;

FIGS. 7A to B microscope images of mushroom-shaped microfibers with different ARs printed against skin with varied preload pressure;

FIGS. 8A to F microscope images of mushroom-shaped microfibers printed against skin with different preload pressures (pattern geometry: 45-99 μm tip diameter, 45 μm stem diameter, 90 μm height, and 55 μm spacing);

FIGS. 9A to H microscope images of mushroom-shaped microfibers with different VS thicknesses and printed against skin (pattern geometry: 45-100 μm tip diameter, 45 μm stem diameter, 90 μm height, and 55 μm spacing);

FIGS. 10A to H microscope contact images of mushroom-shaped microfibers printed against flat glass after different pre-crosslinking durations of the thin VS films (pattern geometry: 45-95 μm tip diameter, 45 μm stem diameter, 90 μm height, and 55 μm spacing);

FIG. 11 photograph of the custom experimental setup for adhesion characterization;

FIG. 12 adhesion comparison of microfibrillar and unstructured adhesive samples;

FIGS. 13A to G results of durability and biocompatibility experiments of adhesive films on the skin;

FIGS. 14A to C photographs of microfibrillar adhesive films (see FIGS. 14A & 14B, as well C) adhesion comparisons of microfibrillar adhesives measured on dry and wet skin;

FIG. 15 fabrication process of flexible strain sensors integrated with skin-adhesive microfibrillar PDMS films; and FIGS. 16A & B microcrack propagation in the AgNP thin film upon stretching.

In the following the same reference numerals will be used for parts having the same or equivalent function. Any statements made having regard to the direction of a component are made relative to the position shown in the drawing and can naturally vary in the actual position of application.

FIG. 1A shows a schematic overview of the steps required to make a carrier 10. In particular the fabrication process for skin-adhesive microfibrillar films 10. The method comprises the steps of providing a mold 12 having cavities 14 formed therein complementary to the desired shape of islands 26 to be formed at the carrier 10. In the present instance a liquid PDMS precursor solution was first cast onto a mold 12 with cylindrical cavities (step i), in order to fill the cavities 14 of the mold 12 with a first material 16 (PDMS).

In the present instance the first material 16 not only flows into the cavities 14 but it is also distributed over the surface of the mold 12 and used to form a backing substrate 20. This is shown in step ii. The excess PDMS was removed with a bar coater 22 in order to obtain a 200 μm thick backing substrate 20 (step ii).

Once the bar coater 22 has been used to define a thickness of the backing substrate 20 the next step employed is a curing step in which the first material 16 is cured for 1 hour at 90° C. (step iii) to form a patterned surface 24 on top of the backing substrate 20 (i.e. at the bottom surface of the backing substrate). After curing the PDMS precursor solution, uniformly shaped cylindrical microfibers (islands 26 also termed pillars 26) are obtained. The pillars 26 become visible upon demolding the carrier 10 from the mold 12 (step iv) (see also FIG. 5 in this regard).

In order to carry out a coating step (step vi), a 40 μm thin and homogeneous layer of a vinylsiloxane (VS) precursor solution 28 is next coated over a glass plate 30 by a film applicator 32 (step v) and partially crosslinked before the islands 26 of the carrier 10 are inked. Following this the islands 26 of the carrier 10 are at least partly immersed in a curable ink 28 formed by the thin and homogeneous layer of the VS precursor solution 28.

In order to carry out this step vii the carrier 10 with islands 26 with and tips 28a thereon are placed on the object 34a, the ink is not yet completely cured and can conform and/or adapt to the surface of the object 34a to which it is to be attached. The micropatterned PDMS film 10 is in this way manually inked to permit a selective transfer of the viscous VS 28 onto the microfiber tips 28a (step vi).

Step vii shows the combined steps of placing the islands 26 of the carrier 10 comprising the tips 28a present thereon onto an object 34a; and then finally curing, i.e. completely curing, the material of the ink 28a to adhere or form a bond between the carrier 10 and the object 34a.

The microfibers (pillars 26) coated with the viscous VS tips 28a were applied to a surface 34a of an object. In the present instance to a skin surface 34a acting as the object. In order to aid the attachment of the carrier 10 to the skin surface 34a, a soft foam 36 was then placed on the backside of the micropatterned film-like carrier 10 and a preload was applied to ensure conformal contact of the viscous VS tips 28a to the object having a hierarchical skin topography (step vii). In this connection the preload is selected in the range of 0 to 25 kPa Within a few minutes, the viscous VS 28a was directly crosslinked to the skin surface 34a and to the islands 26, leading to a strong skin adhesion. It should be noted that PDMS was utilized for the fabrication of microfibers 26 due to its slow crosslinking and low viscosity, enabling PDMS microstructures with optimal shapes and homogenous micropatterns. The fast crosslinking kinetics of the VS may cause imperfect mold replication, leading to shallow concave and convex micropatterns.

The carrier 10 shown in FIG. 1A vi is configured to be attached to a human or animal body. The carrier 10 comprises a backing substrate 20, and a patterned surface 24 having islands 26 present at the surface 24, with the islands 24 and the backing substrate 20 being made of the same flexible material 16 namely PDMS. Voids 38 are present between the islands 24. A free surface of all of the islands 26 is coated with an ink 28 to form the tip 28a of the islands 26 by means of the ink 28.

In the present instance the islands 28 are integral with the backing substrate and are regularly spaced asperities in the form of pillars 26. In the example shown, the aspect ratio of the pillars 26 is at least substantially 2. It should however be noted that the asperities 26 can have an aspect ratio selected in the range of $10^{-4}$ to $10^4$, if e.g. carbon nanotubes are used as pillars 26, preferably in the range of 0.01 to 10000, if other forms of nanostructures are used, such as ZnO nanowires, most preferably in the range of 0.01 to 1000 and especially in the range of 0.1 to 100 if elastomers such as silicone rubbers are used as a material for the pillars 26.

The adhesion properties of the carrier 10 to the skin 34a can be manipulated by manipulating the aspect ratio of the pillars 26 in dependence on the material 16 used for the pillars 26. Moreover, the adhesion properties can be influenced by the density of pillars 26 selected, i.e. by the ratio of surface area of pillars 26 to the surface area of the voids 38 and by the VS tip size of the mushroom shaped patterns (3D-F).

It should further be noted that the backing substrate 20 can be formed from a second material different from the material of the pillars 26. For example the backing substrate 20 can be formed of PDMS and the pillars 26 are respectively formed from small metal wires (not shown). The small metal wires can then thermally and electrically conduct signals to and from the skin 34a of a patient via the carrier 10 to e.g. electrodes or other forms of sensors (see FIG. 4 in this regard). The sensors are then attached to the backing substrate 20 that then acts as an interface to a payload, such as an electrode.

It should further be noted that at least one of the islands 26 and the backing substrate 20 can comprise filler materials, wherein the filler materials are preferably selected from the group of materials consisting of organic, inorganic, metals, alloys, ceramics, glass, polymers, rubbers, biomaterials, composites, foams, fabric materials, particle material, fibrous material and combinations of the aforementioned materials It should also be noted that a material of the islands and/or of the backing substrate is selected from the group of members consisting of organic, inorganic, metals, alloys, ceramics, glass, polymers, rubbers, biomaterials, composites, foams, fabric materials, particle material, fibrous material and combinations of the aforementioned materials.

Preferably the compliant material forming the islands 26 and/or the backing substrate 20 is a flexible material. The flexible material having a Young's modulus selected in the range of 10 kPa to 600 MPa. In contrast to e.g. metal, such as steel having a Young's modulus of 200 GPa such materials are very flexible.

In this connection the ink preferably comprises a curable material, i.e. a material that provides a adhesion or crosslinking to the material of the islands, with the curable material being selected form the group of members consisting of the same material as the islands, thermally crosslinkable material, photocrosslinkable material, moisture crosslinkable material, catalytically crosslinkable material, redox reaction crosslinkable material and combinations of the foregoing. In this way the ink is selected to adhere or bond the islands of the carrier to a further object.

VS is selected as a skin interfacing material 28a and 28b due to its several features that can influence the skin adhesion. First, VS is developed and approved for biomedical applications (e.g., forming dental impressions). In fact, neither its individual components (base and catalyst) nor the precursor solution cause any biocompatibility issues. Therefore, it prevents skin or tissue irritation even after direct crosslinking on the skin 34a. Second, this two-component material possesses much faster crosslinking kinetics than other elastomers, such as PDMS and Ecoflex. Consequently, it can be fully crosslinked within a few minutes at room temperature. Third, its suitable viscosity enables successful transfer-patterning processes and texture/roughness conformation. Last, it belongs to the family of silicone rubbers and allows covalent bonding with base PDMS microfibers.

The carrier formed using the method described in the foregoing is made of compliant material. This means it is formed from a material that permits the connection of certain surface topologies and/or surface properties thereto. In this connection it forms a point of connection between biological tissue and non-biological tissue, between rough surface topologies and smooth surface topologies, between moist, in particular wet surfaces and dry surfaces, between soft surfaces and rigid surfaces as well as between comparatively dirty surfaces and clean surfaces and vice versa.

These different uses are made available as the compliant material of the carrier makes it possible to compensate for the differences between the two kinds of material between which a connection is to be formed. This is mainly due to the fact that the compliant material permits an inherent deformation of itself to permit an adaptation of its structure to the topology of at least one of the surfaces to which the carrier is to be attached.

Figure 6:
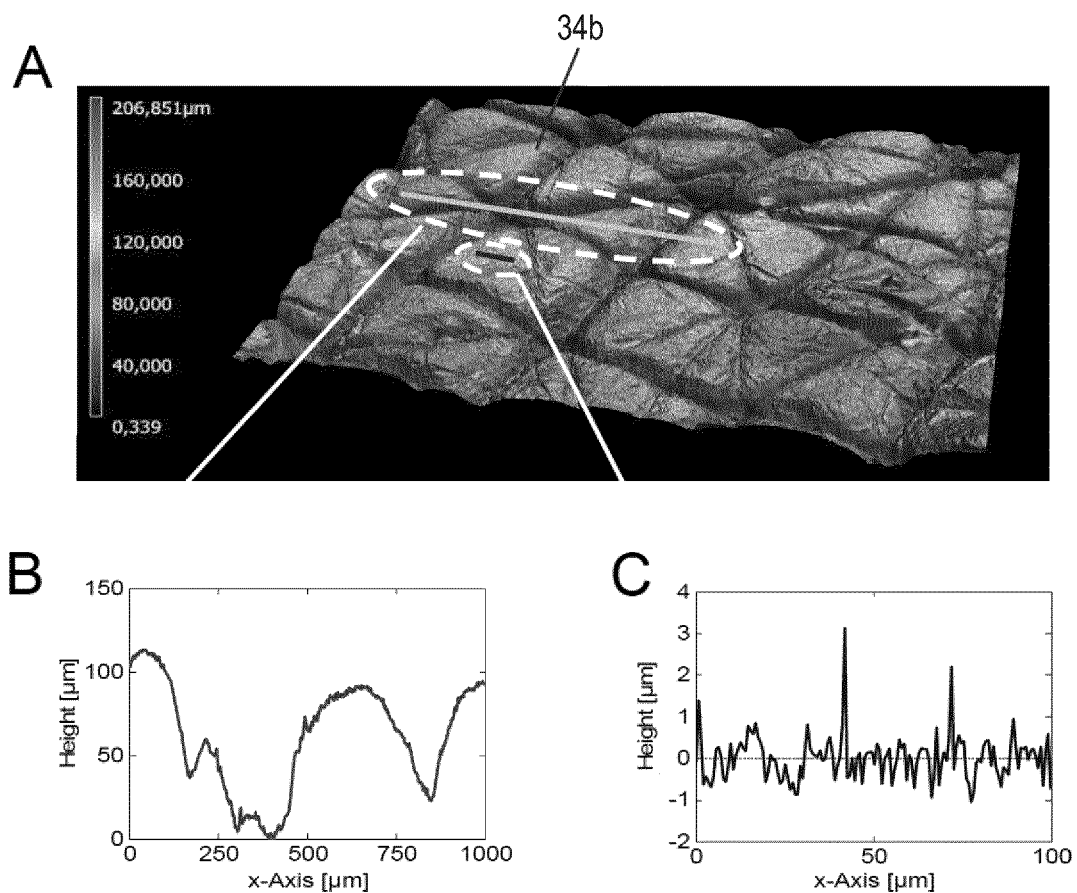

FIG. 1B shows a three-dimensional (3D) laser-scanning microscope image of the skin surface 34a in the forearm have shown that skin possesses dual-scale roughness (from micro to nanoscale) (see also FIG. 6 in this regard). Moreover, the skin surface 34a is composed of island-like planar areas with an averaged surface roughness of 0.4 μm separated by interconnected microgrooves having vertical roughness of around 104.2 μm. In fact, one of the main skin adhesion challenges is conformation to high and multi-length scale roughness of the skin surface 34a.

Figure 10:
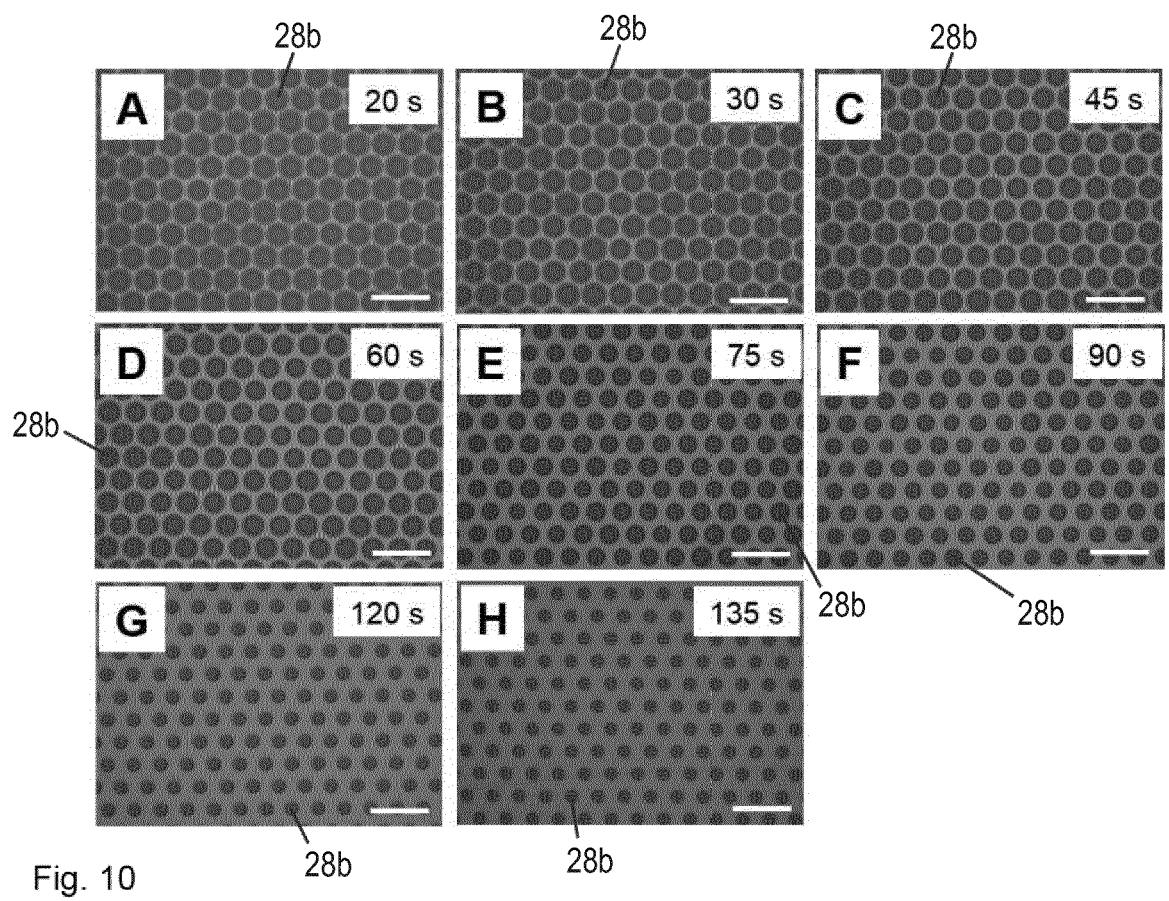

FIG. 10 illustrates a representative cross-sectional scanning electron microscope (SEM) image of a composite microfiber adhesive film 10 attached to a skin replica 34b, showing conformal interfacing between the adhesive film 10 and skin replica 34b. Furthermore, PDMS microfibers 26 act as load-transferring components while crosslinked VS tips 28b provide a strong adhesion to the skin.

FIG. 1D) shows a cross-sectional SEM image of an adhesive film after its detachment from a planar area of the skin, showing mushroom-shaped fibers with optimally shaped tips. FIG. 1E) shows a cross-sectional SEM image of microfibers 26 showing the conformation of different fiber tips 28b on different locations on the skin; the second fiber is detached from microgrooves of the skin surface 34a while the third one conformed to a planar area. The scale bar indicated in FIGS. 1C to E amounts to 100 μm.

In this connection it should be noted that mushroom-shaped microfibers 26 means that the fibers 26 have a diameter at least in their central region which is reduced in comparison to the diameter of the tip 28b. The increase in diameter at the tip 28b is brought about by the coating of the tip 28a of the pillar 26 with the ink 28.

As shown in FIG. 10, mushroom-shaped microfibers 26 with optimal tip 28b shapes were formed when the viscous VS 28a was directly crosslinked on the planar area of the skin 34a. Additionally, the ink of the viscous VS tips 28a completely filled the space of the skin microgrooves prior to its crosslinking (FIG. 1E). Therefore, the presented micropatterned adhesive films 10 are capable of establishing an intimate contact with both micro- and nanoscale roughness of the skin.

Figure 2:
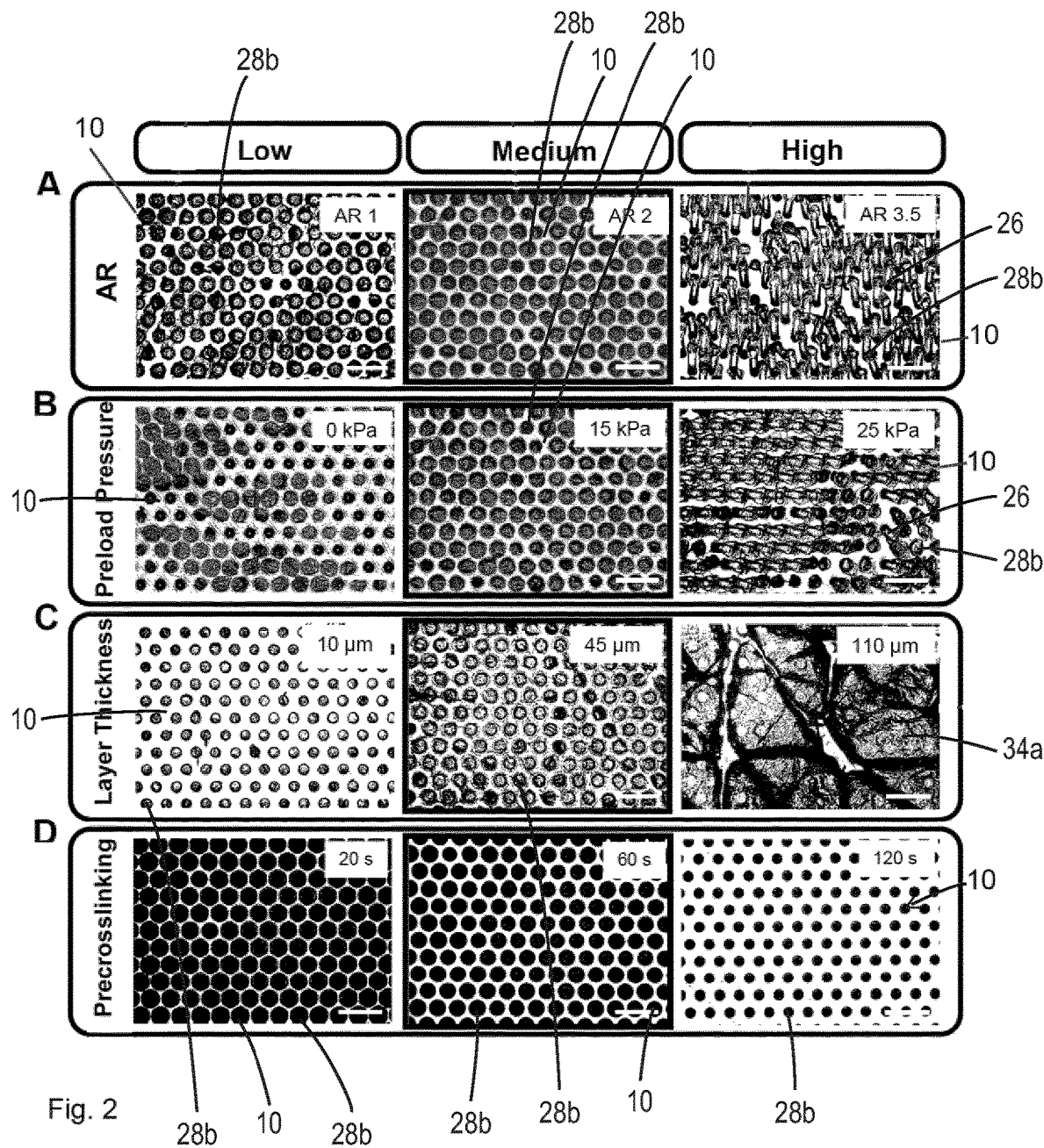

FIG. 2 shows the optimization of the process parameters, including aspect ratio AR, preload pressure, layer thickness, and precrosslinking duration. In this regard further experiments were carried out to optimize the structural integrity of PDMS microfibers 26 as well as shape adaptation of the crosslinked VS tips 28b by varying the aspect ratio (AR) of PDMS microfibers 26, applied preload pressure, layer thickness of the viscous VS, and pre-crosslinking duration. To this end, the surface topology of all adhesive samples was imaged and the possible buckling/collapse of microfibers was exploited and contact quality of the inked tips after their complete detachment from skin and glass was investigated (see FIG. 2, Table 1, and FIGS. 7-10), as will be discussed in the following.

FIG. 2A) shows optical microscope images of patterns with different ARs after their detachment from the skin 34a. It was observed that microfibers 26 with an AR of 2 accomplished adequate conformation to the multi-length scale roughness of the skin by applying moderate preloads. Microfibers 26 with an AR of 1 showed only partial contact with skin microgrooves, whereas microfibers 26 with an AR of 3.5 were buckled even under small preloads due to their insufficient bending stiffness (see FIG. 2A and FIG. 7).

On the other hand, a moderate preload pressure of 15 kPa appeared to be the optimal value for micropatterns made of microfibers with an AR of 2, enabling them to fully contact the skin roughness. FIG. 2B) shows microscope images of patterns under different preload pressures after their detachment from the skin 34a. As shown in FIG. 2B, homogeneous and large mushroom-shaped VS tips 28b were formed when a preload of 15 kPa was applied to a skin-adhesive film 10. In contrast, small and spherical crosslinked VS tips 28b were formed under insufficient preload, and micropatterns were partially or completely collapsed when the preload pressure exceeded 20 kPa (see FIG. 2B and FIG. 8).

FIG. 2C) shows microscope images of patterns inked to the viscous VS layer with different layer thicknesses after their detachment from the skin 34a. The viscous VS film 28 with layer thickness in the range of 35 to 45 µm resulted in homogeneous and large mushroom-shaped tips 28b (FIG. 2C). For thinner layers, however, the amount of viscous VS transferred to the tips 28b of microfibers 26 was small and insufficient for strong skin adhesion (see FIG. 2C and FIG. 9).

Furthermore, microfibers 26 were fully immersed into the viscous VS film 28 when the layer thickness approached or surpassed the fiber height. Additionally, it was found that 30 to 60 seconds was the ideal precrosslinking time range for high throughput inking and transfer-patterning processes (see FIG. 2D and FIG. 10). FIG. 2D) shows microscope images of microfibers inked into VS films after different precrosslinking durations and then printed on flat glass slides. Optimal process parameters are indicated with dashed borders. The scale bar indicated in FIG. 2D corresponds to 200 µm.

For shorter precrosslinking time, the initial viscosity was low and the amount of the transferred viscous VS to the tips 28b of microfibers 26 was large, leading to connected microfiber tips. On the other hand, the viscosity was high for long precrosslinking duration and no VS was transferred to the tips of the microfibers (see FIG. 2D and FIG. 10).

Figure 3:
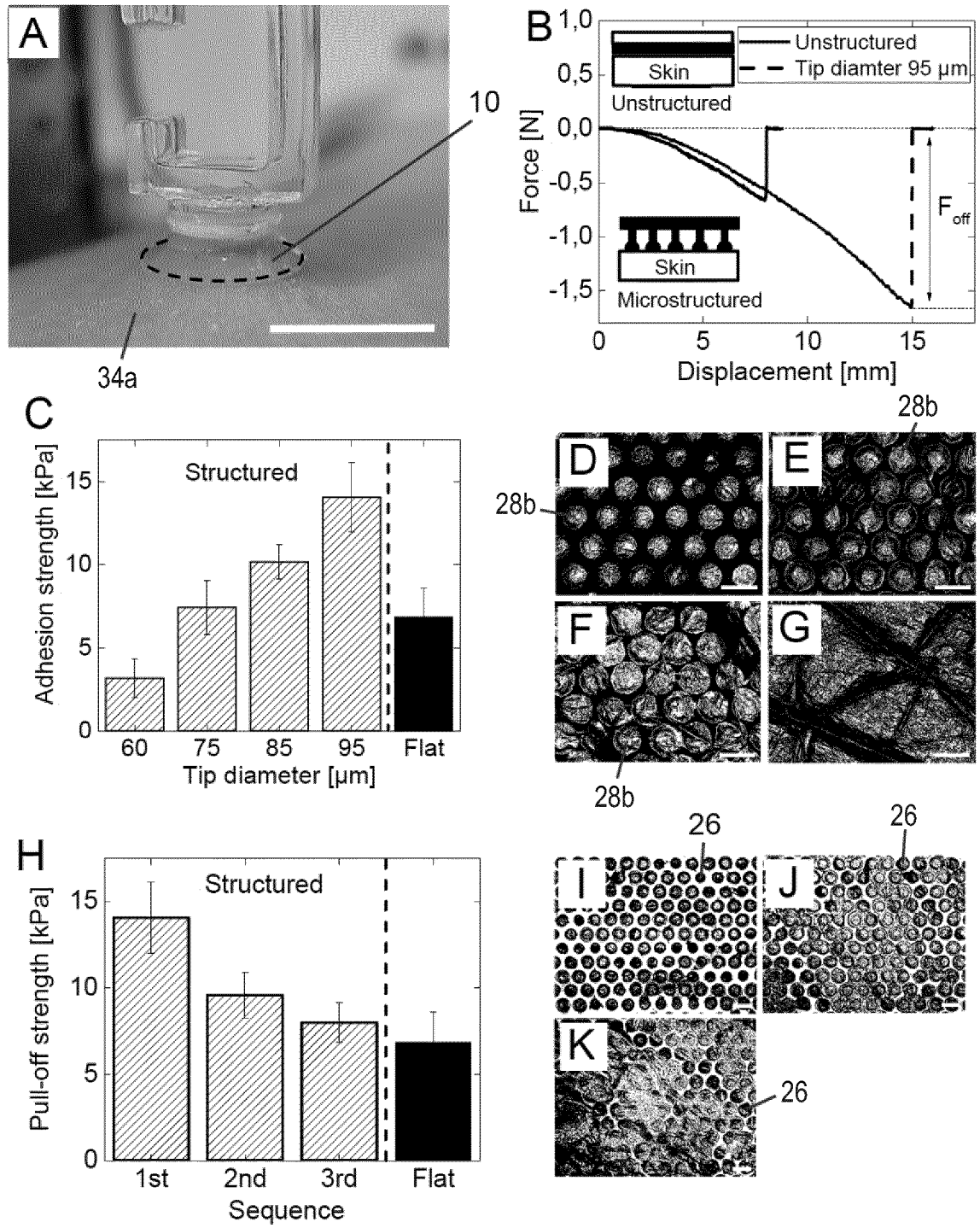

FIG. 3 shows force-displacement curves and adhesion measurements of the composite microfibrillar adhesive films 10 attached to the skin 34a. In order to quantitatively analyze the adhesion performance of the adhesive films 10, circular-shaped adhesive samples with 1 cm² area were attached onto the human skin 34a in the forearm area and their force-displacement curves were measured by a customized adhesion setup (see FIG. 3A and FIG. 11 that shows a photograph of a custom experimental setup for adhesion characterization).

In this regard FIG. 3A) shows a photograph of a skin adhesive film 10 attached to the biological human forearm 34a during the retraction cycle of the adhesion experiment; the dashed line indicates the interfacing border between the adhesive film and the skin. The scale bar indicated corresponds to 1 cm.

FIG. 3B illustrates the force-displacement curves for a PDMS microfiber array with an averaged VS mushroom-shaped tip 28b diameter of 95 µm (see inset of FIG. 3B). For comparison, the adhesion performance of an unstructured sample (i.e., a flat PDMS film attached to the skin 34a via the VS interfacing layer) (see inset of FIG. 3B) was also measured. The preload pressure, layer thickness of the viscous VS layer, and crosslinking time were kept the same for both samples. The adhesion force ($F_{off}$) for microfibrillar and unstructured samples was 1.7 and 0.7 N, respectively, showing significant enhancement of the skin adhesion using microfibrillar adhesive films 10. The high adhesion performance of mushroom-shaped fibers originates from more uniform stress distribution at the fiber 26 tip 28b interfaces. Longer retraction distance of the microfibrillar sample before its detachment from the skin 34a further confirms the improved load sharing of mushroom-shaped fibers.

FIG. 3C illustrates the adhesion strength of microfibrillar adhesive films 10 with different VS tip 28b diameters. The VS tip 28b diameter was controlled by tailoring the layer thickness of the viscous VS film 28. The adhesion strength was dependent on the tip 28b diameter. Furthermore, the micropatterned adhesive films 10 with larger VS tip 28b sizes produced higher adhesion strength. The maximum adhesion strength of 18 kPa was achieved by a microfiber array with an averaged VS tip diameter of 95 µm. The higher adhesion strength of microfibers with larger VS tips is attributed to their optimized geometry and subsequent improved load sharing due to their enhanced roughness and texture conformation.

FIGS. 3D-G) show microscope images of the corresponding samples with an averaged tip diameter 28b of (D) 60 µm, (E) 85 µm, (F) 95 µm, and (G) the unstructured sample. The indicated scale bar corresponds to 100 µm. FIG. 3H) shows an adhesion strength of skin adhesive films 10 after multiple inking and attachment processes. FIGS. 3I-K) show microscope images of microfibers 26 after J) first, K) second, and L) third attachment cycles. The indicated scale bar corresponds to 100 µm.

To confirm the remarkable adhesion improvement of the adhesive films 10 through crosslinking of the viscous VS tips 28a directly on the skin 34a, the adhesion strength of a microfibrillar PDMS film 10 was measured with crosslinked VS mushroom-shaped tips 28b. The adhesion strength of the adhesive film 10 directly cross-linked onto the skin surface was 200 times higher than that of the microfibrillar PDMS sample, where mushroom-shaped tips were fully crosslinked before their application to the skin (see FIG. 12 discussed in the following). This significant improvement in the skin adhesion is due to the high shape conformation of the viscous VS tips 28a to the skin surface 34a prior to their complete crosslinking. The reusability of the adhesive films 10 was tested by multiple times inking and printing of a microfibrillar adhesive film 10.

The adhesion strength of the sample was 14, 10, and 8 kPa for first, second, and third time inking, respectively. Indeed, the adhesion strength approached that of the unstructured sample after three cycles of inking (FIG. 3H). Moreover, more crosslinked VS was accumulated on the microfiber tips 28b during each inking and printing cycle and a partial or complete VS film was formed on microfibers, degrading the contribution of mushroom-shaped fibers to the adhesion improvement of the adhesive film (see FIGS. 3I-K).

Additional experiments were conducted to investigate the durability and biocompatibility of the fabricated skin-adhesive films. Both microfibrillar 10 and unstructured 10' samples were attached to the skin 34a in the human forearm and subjected to repeated bending-straightening cycles. The microfibrillar skin-adhesive film 10 exhibited a robust skin adhesion after more than 300 loading cycles, while an unstructured sample started to partially detached from the skin after 100 cycles (see FIG. 13).

After cyclic loading test and detachment of the microfibrillar adhesive film 10 from the skin 34a, no irritation was observed on the skin surface. Possible skin irritation of the microfibrillar adhesive film 10 upon prolonged use was further studied. There was no skin irritation when a micropatterned adhesive film 10 was mounted onto the skin 34a for over 24 hours (see FIG. 13 discussed in the following). Notably, the presented microfibrillar adhesive films could also adhere to the wet skin surface with high adhesion strength and durability (see FIG. 14). Therefore, the presented composite microfibrillar skin-adhesive films 10 could provide strong skin adhesion with high durability and minimal irritation.

Figure 4:
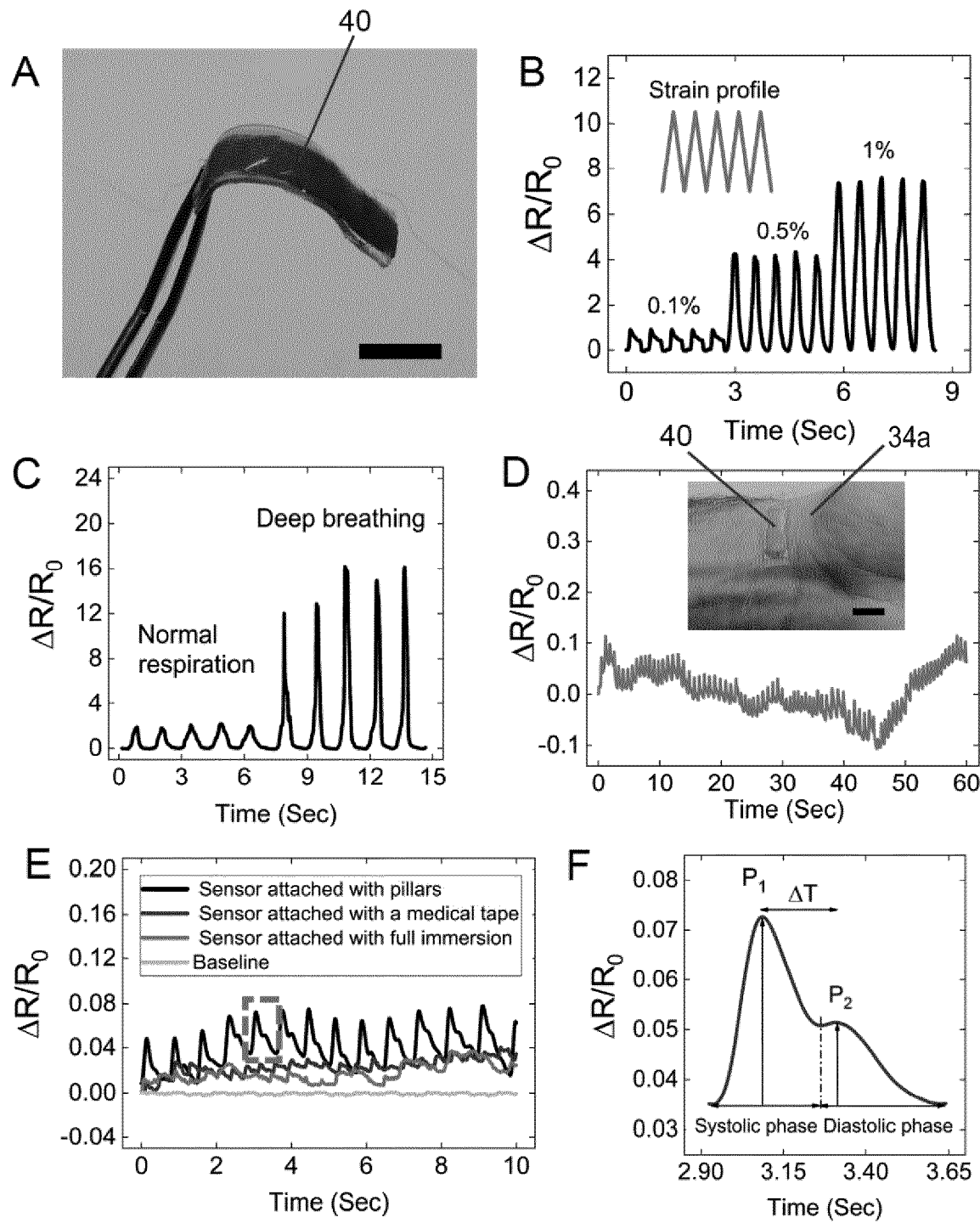

FIG. 4 shows the application of a payload 40 at the backing substrate 20. In the present example these are wearable skin-adhesive strain sensors 40 for healthcare applications. FIG. 4A) shows a photograph of a strain sensor 40 fabricated on the top of a microfibrillar adhesive film 10, showing high flexibility of the device 10. In the following the utility of the skin-adhesive films 10 will be demonstrated by integrating them with flexible strain sensors 40 for detection of tiny skin deformations. Silver nanoparticle (AgNPs) thin films-based strain sensors 40 were fabricated on the top of the micro-patterned PDMS films 10 (see FIG. 15).

The integrated skin-adhesive sensors 40 were highly flexible and could easily be attached onto the skin (FIG. 4A). FIG. 4B illustrates the electromechanical behaviour of a strain sensor prototype under repeated stretching-releasing cycles. The strain sensor 40 was subjected to saw-tooth strain profiles with a frequency of around 1.8 Hz while its resistance was simultaneously recorded. The strain sensor 40 could precisely measure strains from 0.1% to 1% with significant resistance changes. The gauge factor (GF) of the strain sensor 40—relative change of the resistance divided by the applied strain—in the linear range of 0 and 1% was around 767, showing ultrahigh sensitivity of strain sensors. The ultrahigh GF of the strain sensor 40 was attributed to the microcrack opening-closing mechanism of AgNP thin films under stretching-releasing cycles (see FIG. 16).

FIG. 4C shows the response of a microfibrillar skin-adhesive strain sensor 40 attached to the human chest area 34a. The resistance of the sensor rapidly increased/decreased upon inhalation/exhalation due to the expansion/shrinkage of the chest during respiration. Furthermore, the microfibrillar skin-adhesive strain sensor could distinguish normal and deep respirations with a considerable signal difference. Real-time detection of abnormal respiration rate and temporal patterns can help early diagnosis of several diseases such as asthma, hearth failure, embolism, and so on.

The inset of FIG. 4D depicts a microfibrillar skin-adhesive strain sensor 40 mounted on the radial artery of the wrist 34a. The strain sensor 40 was strongly adhering to the skin 34a owing to the high adhesion strength of the presented composite microfibrillar adhesive film 10. There was no detachment or delamination of the sensor 40 from the skin 34a even under large straining conditions.

FIG. 4D illustrates a record of the blood flow pulse over one minute, showing the heart rate with the frequency of 84 beat per minute. Although there were changes in the base resistance of the sensor 40 due to movements of the hand, the sensor could record the blood flow pressure with high sensitivity.

FIG. 4E depicts the response of the skin-adhesive sensor 40 for 10 seconds, clearly indicating that the waveform pattern of the artery pulse was detectable. Furthermore, both systolic and diastolic phases and peaks were successfully identified by the sensor output signal (FIG. 4F). This waveform corresponds to the radial blood flow pulse for an adult on his third decade life with a compliant vein. The time delay between systolic and diastolic peaks ($\Delta T$) was around 220 ms. The derived arterial stiffness index (S.I.=volunteer height/$\Delta T$) and reflection index (R.I.=$P_2/P_1 \times 100$) were around 7.5 and 43.7%, respectively, all within the normal range of a healthy person.

The effect of the sensor attachment method on the output signal amplification was further investigated. A microfibrillar skin-adhesive strain sensor 40 was mounted onto the radial artery of the wrist by a commercial pressure-sensitive medical tape, micropatterned PDMS 10 with VS tips 28a, and micropatterned PDMS 10 fully immersed into the 100 μm thick flat VS film 28. To avoid stiffening of the skin-adhesive sensor 40, only two ends of the sensor 40 were attached to the skin by the medical tape (not shown).

The contact spot of the sensor 40 was maintained identical to minimize possible signal variations. As shown in FIG. 4E, small peaks appeared in the sensor output when the sensor was attached by the medical tape, indicating a weak transfer of the skin deformation to the sensor because of the poor contact area and insufficient adhesion of the bare microfibers. On the other hand, the microfibrillar skin adhesive films 10 with VS tips 28b showed maximum signal transfer to the strain sensor 40 due to their softness, arrayed micropillar structure, and strong attachment of individual microfiber to the skin surface. Irregular waveform patterns were recorded once the sensor 40 was mounted onto the skin 34a by way of the carrier 10 with fully immersion process. This low signal quality is believed to be due to the reduced flexibility of the solidified VS film, making to whole sensor structure stiffer. Indeed, microstructured sample with VS tips 28b was softer than the fully immersed sample due to the contact splitting between VS tips 28b, leading to enhanced signal transfer.

To quantitatively assess the signal enhancement of the strain sensor attached by microfibrillar adhesive films, the SNR of the sensor was calculated as:

$$SNR = avg(\Delta R)/f_{baseline}$$

where avg(ΔR) is the averaged resistance change of the sensor during radial pulse measurements and $f_{baseline}$ is the standard deviation of the baseline signal where no strain is accommodated by the sensor. The SNR of the strain sensor 40 attached by our micropatterned adhesive films 10, medical tape, and fully immersion method was 59.7, 10.2, and 8.3, respectively. The significant improvement in the SNR of the strain sensor 40 is due to the high adhesion strength of our micropatterned adhesive films 10, together with their softness and flexibility.

In the foregoing, a novel approach for high-performance skin adhesion was presented. The high adhesion strength of adhesive films 10 was found to be due to the enhanced roughness and texture conformation, and load sharing of the PDMS microfibers 26 decorated with crosslinked VS tips 28b. Highly flexible, conformable, and biocompatible microfibrillar skin-adhesive films were easily integrated with wearable soft strain sensors 40 to enable their strong bonding and high signal enhancement on the skin 34a for healthcare monitoring applications. In addition to skin 34a, the proposed composite microfibrillar adhesive films 10 could attach to other surfaces with complex topographies and a wide range of surface roughness length scales under various dry and wet environmental conditions.

Figure 5:
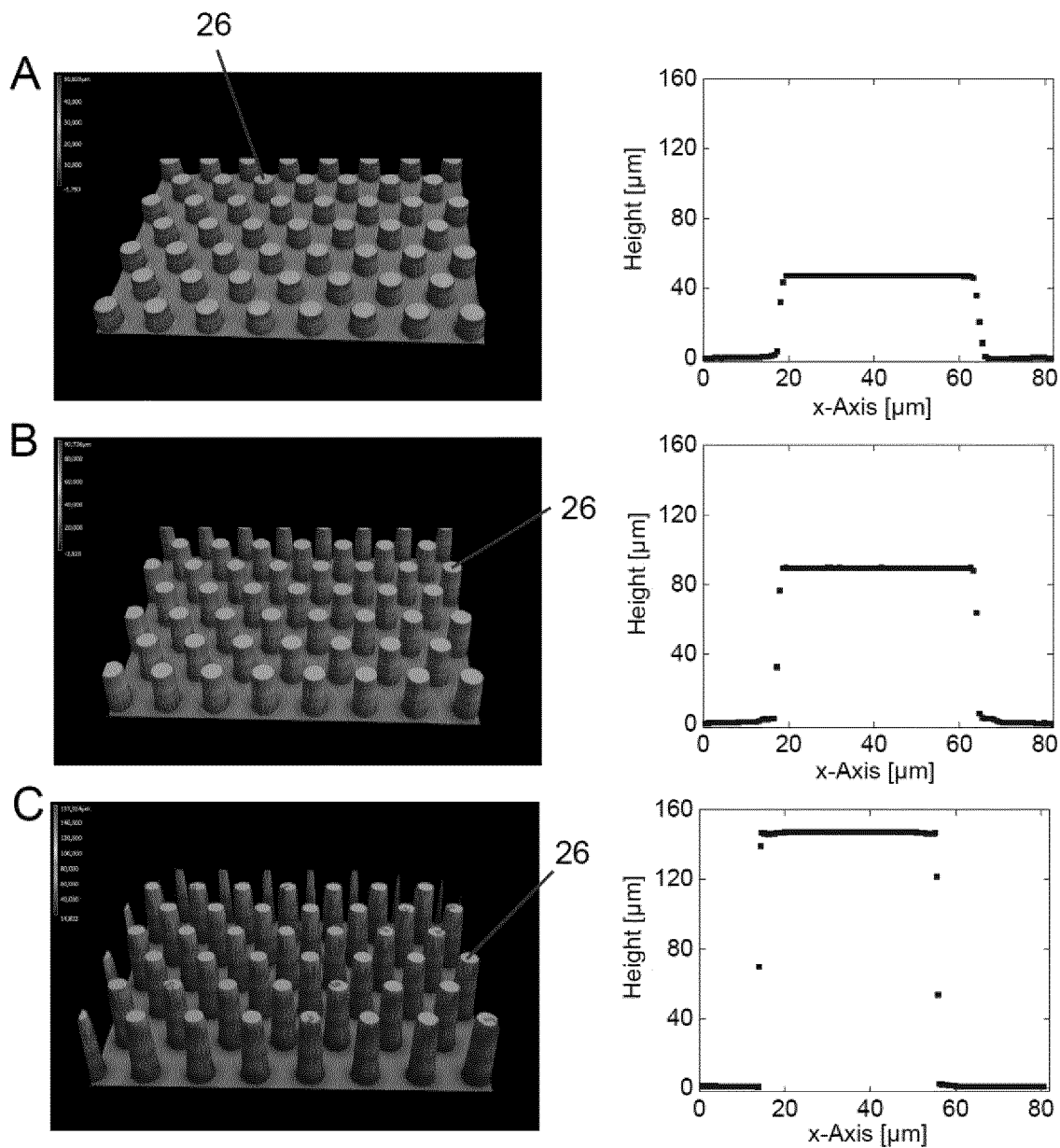

FIG. 5 shows 3D laser-scanning microscope images of PDMS microfibers 26 with different ARs. FIG. 5A) shows cylindrical patterns with an AR of 1 (45 μm tip diameter, 47 μm height, and 55 μm spacing). FIG. 5B) shows cylindrical patterns with an AR of 2 (45 μm tip diameter, 90 μm height, and 55 μm spacing). FIG. 5C) shows cylindrical patterns with an AR of 3.5 (41 μm tip diameter, 146 μm height, and 59 μm spacing).

FIG. 6 shows a 3D laser-scanning microscope image of an artificial PDMS skin replica 34b. FIG. 6A) shows positive replica 34b showing the hierarchical topography of the skin. FIG. 6B) shows microscopic roughness of the microgrooves with vertical roughness of 104.2 μm. FIG. 6C) shows nanoscale roughness of the planar skin area with an averaged surface roughness of 0.4 μm.

Table 1 shows a summary of the systematically tested parameters showing the most optimal (white), intermediate optimal (grey), and non-optimal (dark grey) conditions. The optimization was started with the AR followed by other parameters

| AR [-] | Flat | 1 | 2 | 3.5 | | |
|---|---|---|---|---|---|---|
| Tip Diameter [μm] | 60 | 75 | 85 | 95 | Flat | |
| Preload Pressure [kPa] | 0 | 5 | 10 | 15 | 20 | |
| Layer Thickness [μm] | 10 | 25 | 35 | 45 | 55 | 100 |
| Precrosslinking Time [s] | 15 | 30 | 45 | 60 | 75 | 90 |

Figure 7:
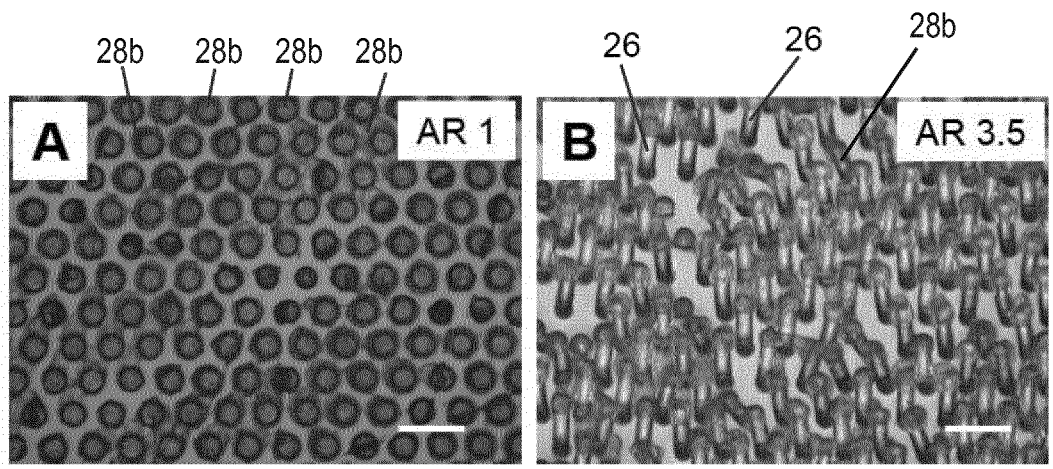

FIG. 7 shows microscope images of mushroom-shaped microfibers 28b with different ARs printed against skin 34a with varied preload pressure. FIG. 7A) shows mushroom-shaped fibers 28b with an AR of 1 and applied preload pressure of 25 kPa (45 μm tip diameter, 47 μm height and 55 μm spacing). FIG. 7B) shows collapsed microfibers 26 with an AR of 3.5 and applied preload pressure of 5 kPa (41 μm tip diameter, 146 μm height, and 59 μm spacing). Scale bar: 200 μm.

Figure 8:
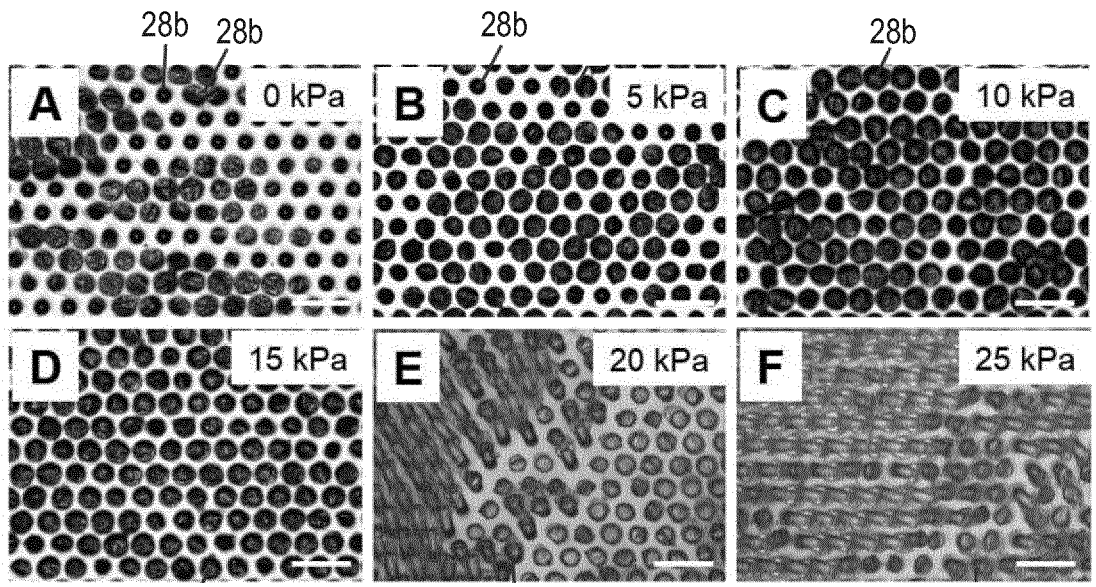

FIG. 8 shows microscope images of mushroom-shaped microfibers 28b printed against skin 34a with different preload pressures (pattern geometry: 45-99 μm tip diameter, 45 μm stem diameter, 90 μm height, and 55 μm spacing). FIGS. 8A-C) show partially mushroom-shaped fibers 28b. FIG. 8D) shows mushroom shaped patterns over the entire array. FIGS. 8E and F) show mushroom-shaped and collapsed patterns upon application of a preload pressure of 20 and 25 kPa, respectively. Scale bar: 200 μm.

Figure 9:
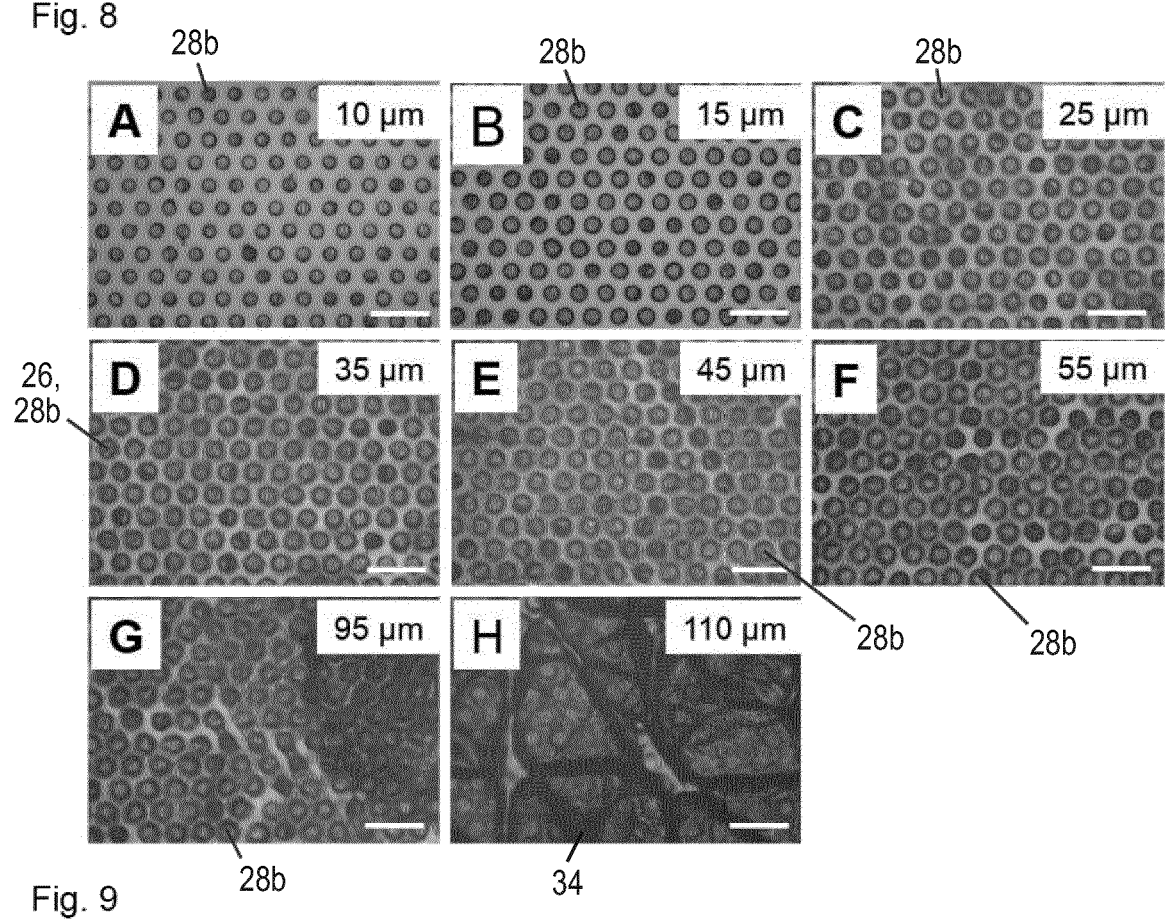

FIG. 9 show microscope images of mushroom-shaped microfibers 28b with different VS thicknesses and printed against skin 34a (pattern geometry: 45-100 μm tip diameter, 45 μm stem diameter, 90 μm height, and 55 μm spacing). FIGS. 9A and B) Small mushroom-shaped fibers. FIGS. C-E) show mushroom-shaped fibers 28b with large VS tips. FIG. 9F) shows interconnected mushroom-shaped fibers 28b with a film on top of the fiber tips. FIGS. 9G and H) show partially or totally immersed fibers. Scale bar: 200 μm.

FIG. 10 shows microscope contact images of mushroom-shaped microfibers 28b printed against flat glass after different pre-crosslinking durations of the thin VS films 10 (pattern geometry: 45-95 μm tip diameter, 45 μm stem diameter, 90 μm height, and 55 μm spacing). FIG. 10A) shows interconnected mushroom-shaped fibers 28b. FIGS. 10B-D) show mushroom-shaped microfibers 28b with large tips. FIGS. 10E and F) show mushroom-shaped microfibers 28b with decreasing tip diameters. FIGS. 10G and H) show cylindrical fibers 26 with no transferred material. The scale bar indicated corresponds to 200 μm.

FIG. 11 shows a photograph of a custom experimental setup for adhesion characterization. In this regard FIG. 11 show an inverted optical microscope 100 (Axio Observer A1, Zeiss) with a video camera 102 (below y-axis stage) (Grasshopper®3, Point Grey Research Inc.), allowing visualization of the contact interface. The adhesion force was recorded by a sensitive load cell 104 (GSO-1K, Transducer Techniques®) attached on a computer-controlled high-precision piezo motion stage 106 (LPS-65 2", Physik Instrumente GmbH & Co. KG) in z-direction, with a resolution of 5 nm and the maximum velocity of 10 mm·s$^{-1}$.

For the y-direction, a long range motor stage 108 (M-605 2DD, Physik Instrumente GmbH & Co. KG) was employed with 1 μm resolution and high maximum velocity up to 50 mm·s$^{-1}$. Fine positioning in the x- and y-directions was done by a manual xy-stage (NFP-2462CC, Positionierungstechnik Dr. Meierling) and tilt correction was adjusted by two goniometers 112 (M-GON65-U, Newport). Motion control of the piezo stages and the data acquisition were achieved by a customized Linux code (Ubuntu™, Canonical Ltd.).

The program made it possible to control preloads, velocities and displacements in the x and z directions, and the contacting time. The displacement of the piezo stages was controlled through a motor controller (Nexact® E-861, Physik Instrumente GmbH & Co. KG). The load cell 104 was linked to the computer via a signal conditioner (both not shown) (BNC-2110, National Instruments) and the voltage signal from the force measurement was transferred through a data acquisition board (PCIe-6259, National Instruments).

Microfibrillar adhesive patches 10 were attached to the skin 34a as described in the foregoing. Please note, that the skin 34a was shaved and washed with detergent prior to the experiment. In order to characterize the adhesion, a micropatterned adhesive film 10 has to be connected to the load cell 104. A C-shaped holder with attached round glass disk with 7 mm diameter was used. The glass disk ensured that only the center of the adhesive pattern 10 was connected to the holder, in order to keep the adhesive system flexible.

For strong bonding between the holder and the patterned adhesives 10, a surface treatment of the holder with an adhesion promoter was required. A 50 μm thick layer of silicone adhesion promoter (Sil-Poxy®, Smooth-On Inc.) was created by a film applicator (Multicator 411, Erichsen GmbH & Co. KG), the holder with attached round glass disc was inked and cured for 30 minutes at room temperature. In the next step, VS polymer was used as bonding material. A thin VS film with 50 μm thickness was created on a glass plate by a film applicator.

The treated holder was dipped into the film and placed on the backside of the attached microfibrillar adhesive 10. After 4 minutes, the VS polymer was fully polymerized and the holder was attached on the adhesive films 10. The forearm with the attached adhesive and holder was positioned under the load cell and connected to another C-shaped holder attached to the load cell via a wide rubber ring. It should be noted that this flexible configuration is crucial, since a more rigid connection would cause detachment of the sample upon small arm motions, which are difficult to suppress.

Additionally, the apparatus offers the possibility to perform precise alignments with the manual stages and goniometers. The positioning in the x- and y-directions was done by a manual xy-stage and tilt was corrected by two goniometers in order to ensure vertical retraction. Finally, the holder was retracted with 100 μm/s until the adhesive patch detached from the skin. The experiments were conducted in a temperature and humidity controlled lab and were in the range of 20-25° C. and 25-35%, respectively. For each data point a minimum of 5 measurements were performed.

FIG. 12 shows an adhesion comparison of microfibrillar and unstructured adhesive samples when the viscous VP layer is directly crosslinked on the skin surface 34a versus samples when the VS layer is fully crosslinked before their application to the skin 34a.

Figure 13:
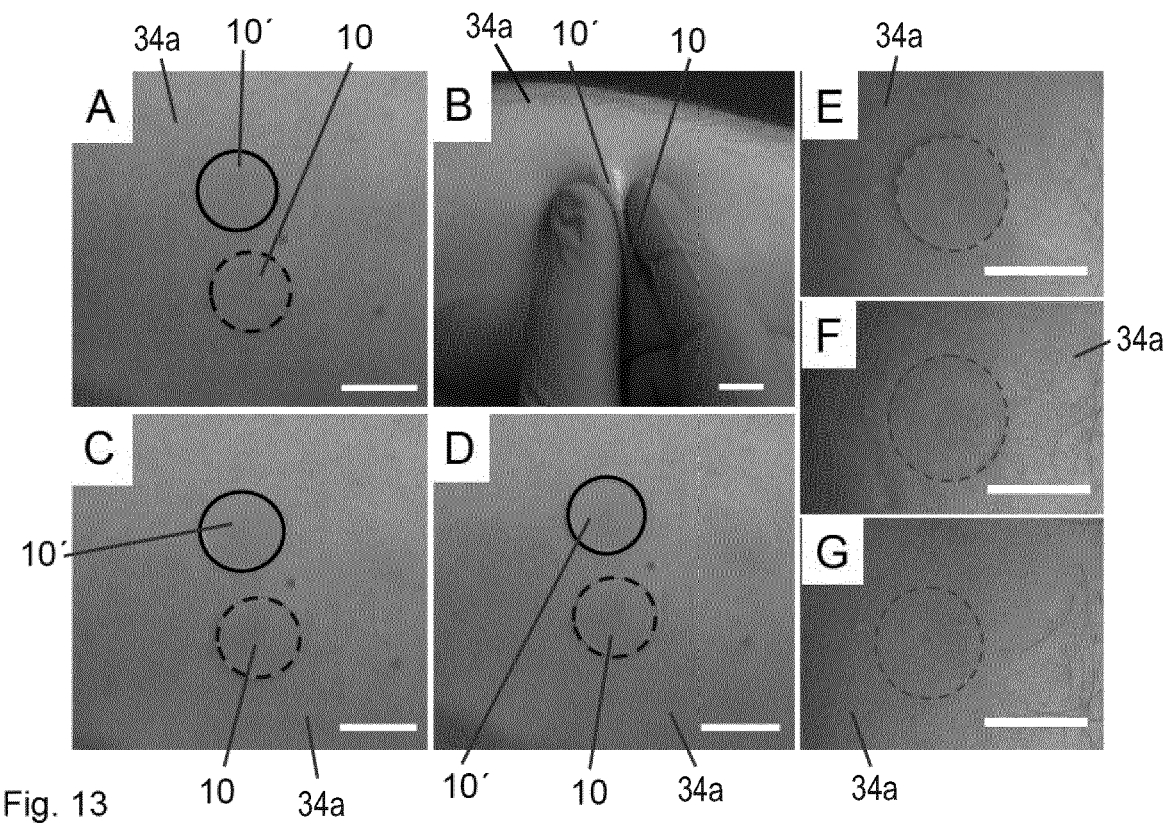

FIG. 13 shows durability and biocompatibility experiments of adhesive films 10 on the skin 34a. FIG. 13A) shows a photograph of microfibrillar 10 (bottom) and unstructured 10' (top) samples attached to the flat skin surface 34a. FIG. 13B) shows a photograph of microfibrillar 10 and unstructured 10' samples under bending condition; the bending curvature was approximately 0.21 mm$^{-1}$. FIG. 13C) shows a photograph of microfibrillar 10 and unstructured 10' samples on the skin 34a after 100 bending-straightening cycles. FIG. 13D) shows a photograph of microfibrillar 10 and unstructured 10' samples on the skin after 300 bending-straightening cycles. FIG. 13E) shows a photograph of the skin surface 34a when a microfibrillar adhesive film 10 was removed from the skin surface 34a right after its attachment. FIG. 13F) shows a photograph of the skin surface 34a upon removal of a microfibrillar adhesive film 10 after 24 hours of its attachment. FIG. 13G) shows a photograph of the skin surface 34a five hours after removal of a microfibrillar adhesive film 10 (the film was attached to the skin for 24 hours of its attachment). Scale bar: 1 cm.

FIG. 14A) shows a photograph of a microfibrillar adhesive film 10 with VS tips 28a on the wet skin surface 34a before applying the preload. FIG. 14B) shows a photograph of a microfibrillar adhesive film 10 with VS tips 28b on the wet skin surface 34a after fully crosslinking the VS tips, showing strong attachment of the adhesive film 10 to the skin 34a. FIG. 14C) shows an adhesion comparison of microfibrillar adhesives 10 measured on dry and wet skin 34a, demonstrating slightly reduced but remarkable adhesion under wet conditions.

FIG. 15 shows a fabrication process for flexible strain sensors 40 integrated with skin-adhesive microfibrillar PDMS films 10. The micropatterned PDMS films 10 were cut into rectangular shapes with width and length of around 7 and 30 mm, respectively. In a first step liquid Ecoflex 50 was next drop-cast on the backing substrate 20 of the micropatterned PDMS film 10 (see FIG. 15-1).

In a second step (see FIG. 15-2) a latex film 52 was placed on the top of the liquid Ecoflex 50 and uniformly pressed. After curing the liquid Ecoflex 50 at 70° C. for 2 hours, the latex film 52 was bonded to the micropatterned PDMS film 10.

Following this in a third step (see FIG. 15-3) a silver conductive paste made of silver nanoparticles (AgNPs) (averaged particle size: 200 nm, Sigma Aldrich) was then coated on the latex substrate 52 and randomly rubbed with a steel blade 56. The rubbing process formed a uniform AgNP film 54 over the entire surface of the latex film 52. The coated conductive film was subsequently dried at 70° C. for 30 min.

It should be noted that latex rubber was used as on top of the backing substrate 20, this is because latex rubber has a rougher surface than PDMS or Exoflex. Compared to complete detachment of AgNP films 54 on the flat PDMS or Ecoflex films, they were strongly adhered to the surface of the latex substrate.

In a fourth step (see FIG. 15-4), copper wires 58 were attached to the two ends of AgNPs films 54 by a silver paste (Sigma Aldrich). Thereafter the silver paste was allowed to cure.

In a fifth step (see FIG. 15-5), the whole conductive film was encapsulated by liquid Ecoflex 60 and cured at 70° C. for two hours. The integrated strain sensor 40 was achieved due to the curing of the top layer of Ecoflex 60.

In a sixth and final step (see FIG. 15-6) the pillars were coated with ink 28 to form partially cross-linked tips 28a, as for the first method described herein.

To evaluate the electromechanical behavior, strain sensors 40 were clamped on a motorized moving stage (M-605 High-Accuracy Translation Stage, Physik Instrumente (PI)) and repeated stretching-releasing cycles were applied to the sensors 40. The corresponding changes in the electrical resistance were simultaneously measured with a data acquisition (DAQ) system (USB X Series Multifunctional DAQ, National Instruments). Prior electromechanical measurements, all strain sensors 40 were stretched to 5% strain to induce microcracks in the AgNP sensing films.

Figure 16:
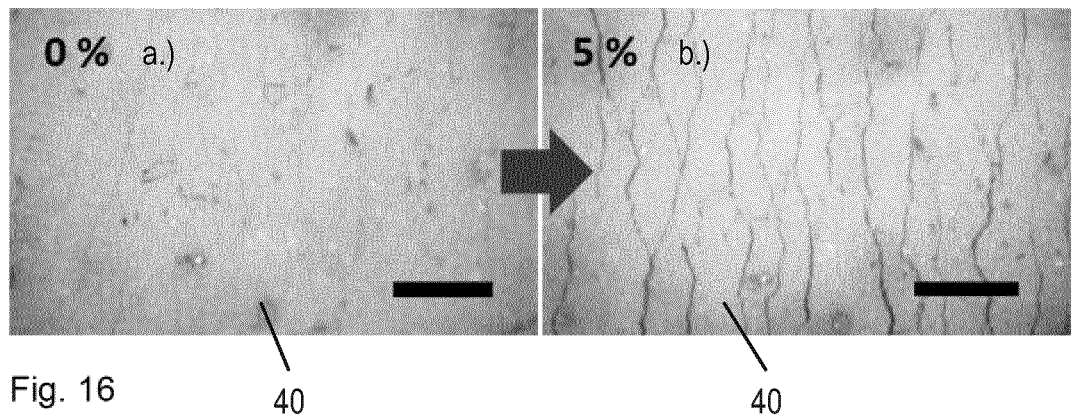

In this regard FIG. 16 shows the surface topology of the AgNP film 54 that was tracked by a 3D laser scanning confocal microscope (Keyence, VK-X200 Series). In particular FIG. 16a shows a surface before stretching and FIG. 16b shows a propogation of microcracks in the AgNP thin film upon stretching by 5%. The scale bar indicated in FIG. 16 amounts to 200 μm.

The invention claimed is:
1. A carrier for adhesive, with the carrier being configured to be attached to a surface, the carrier comprising:
   a backing substrate, wherein the backing substrate is an interface to a payload;
   a patterned surface having islands present at the surface;
   wherein at least one of the islands and the backing substrate is made from a compliant material,
   wherein at least a part of a free surface of the islands is coated with an ink comprising curable material,
   wherein the curable material is a material that provides a cross-linking or adhesion to the material of the islands, with the curable material being the same type of material as the islands or the same material as the islands in combination with one or more materials selected from the group of members consisting of thermally crosslinkable material, photocrosslinkable material, moisture crosslinkable material, catalytically crosslinkable material, or redox reaction crosslinkable material, wherein the ink, after being coated in an uncured state on the free surface of the islands and brought into contact with a further object, and thereafter completely cured, is selected to bond the islands of the carrier to the further object, wherein the ink is selected to form a connection between the payload and the further object, and wherein the payload is configured to determine properties of the object and/or to exert a function on the object, and wherein the ink is tailored to the respective property and/or function for enhancing the transmission of the respective property and/or function to and/or from the payload.

2. The carrier in accordance with claim 1, wherein the ink and the islands form a mechanical connection to the payload, with the mechanical connection being configured to enhance a property of the object to be measured by the payload.

3. The carrier in accordance with claim 2, wherein the payload is at least one of a strain sensor and the ink and the islands are configured to transmit deformations and stresses from the object to the payload, an electrical sensor and the ink and the islands are configured to transmit electrical signals from the object to the payload, a temperature sensor and the ink and the islands are configured to conduct thermal parameters from the object to the payload, and a chemical sensor and the ink and the islands are configured to permit a flow of compounds from the object to the payload.

4. The carrier in accordance with claim 1, wherein a liquid permeability of the free space present between individual islands of the carrier is selected in the range of $10^5$ to $10^{-20}$ [$cm^2$] at room temperature.

5. The carrier in accordance with claim 1, wherein a gaseous permeability of the free space present between individual islands of the carrier is selected in the range of $10^5$ to $10^{-20}$ [$cm^3 \ast cm \ast cm^{-2} \ast s^{-1} \ast cmHg^{-1}$] at room temperature.

6. The carrier in accordance with claim 1, wherein the compliant material is a flexible material.

7. The carrier in accordance with claim 6, wherein the compliant material is a material having a flexibility selected to conform and/or adapt to the topology of the surface.

8. The carrier in accordance with claim 6, wherein the compliant material is a flexible material forming at least one of the backing substrate and the islands and the flexible material has a Young's modulus selected in the range of 10 kPa to 600 MPa.

9. The carrier in accordance with claim 1, wherein voids are present between the islands; and/or wherein the islands are integral with or connected to the backing substrate.

10. The carrier in accordance with claim 1, wherein the islands are regularly or irregularly spaced asperities.

11. The carrier in accordance with claim 10, wherein the asperities are regularly or irregularly shaped, wherein the asperities are pillars.

12. The carrier in accordance with claim 11, wherein the pillars are cubic, pyramidal, spherical, cylindrical, conic, cuboidal, triangular or hexagonal; and/or wherein the pillars have an at least substantially cylindrical shape.

13. The carrier in accordance with claim 10, wherein the asperities have an aspect ratio selected in the range of one of $10^{-4}$ to $10^4$ and 0.01 to 1000.

14. The carrier in accordance with claim 1, wherein the payload present in the form of a sensor is attached to the backing substrate.

15. The carrier in accordance with claim 1, wherein at least one of the islands and the backing substrate comprises filler materials, wherein the filler materials are selected from the group of members consisting of organic, inorganic, metals, alloys, ceramics, glass, polymers, rubbers, biomaterials, composites, foams, fabric materials, particle material, fibrous material and combinations of the aforementioned materials; and/or wherein a material of the islands and/or of the backing substrate is selected from the group of members consisting of organic, inorganic, metals, alloys, ceramics, glass, polymers, rubbers, biomaterials, composites, foams, fabric materials, particle material, fibrous material and combinations of the aforementioned materials.

16. The carrier in accordance with claim 1, wherein the curable material is a material that provides a cross-linking or adhesion to the object to which the carrier is subsequently connected; and/or wherein the ink is selected to releasably bond the carrier to the further object.

17. The carrier in accordance with claim 1, wherein, after curing the ink, a diameter of portions of the islands having the cured ink thereon is smaller, similar or larger than the diameter of said portion prior to the application of ink.

18. A wearable medical device, wherein the medical device comprises the carrier in accordance with claim 1.

19. An object worn at the human or animal skin, wherein the object comprises the carrier in accordance with claim 1.

20. A cosmetic article attachable to a human body, wherein the cosmetic article comprises the carrier in accordance with claim 1.

21. A method of activating a carrier for bonding to an object, the carrier comprising:

a backing substrate, wherein the backing substrate is an interface to a payload;

a patterned surface having islands present at the surface;

wherein at least one of the islands and the backing substrate is made from a compliant material, with the method comprising the steps of:

at least partly immersing the islands of the carrier into an ink reservoir containing uncured ink, the uncured ink being the same type of material as the islands or the same material as the islands in combination with one or more materials selected from the group of members consisting of thermally crosslinkable material, photocrosslinkable material, moisture crosslinkable material, catalytically crosslinkable material, or redox reaction crosslinkable material, placing the islands of the carrier comprising the uncured ink present thereon onto an object; and curing the uncured ink to adhere or form a bond between the carrier and the object to form a connection between the payload and the object via the cured ink, wherein the payload is configured to determine properties of the object and/or to exert a function on the object, and wherein the cured ink is tailored to the respective property and/or function for enhancing the transmission of the respective property and/or function to and/or from the payload.

* * * * *